(12) United States Patent
Freischlad et al.

(10) Patent No.: US 7,583,386 B2
(45) Date of Patent: *Sep. 1, 2009

(54) METHOD AND APPARATUS FOR OPTICALLY ANALYZING A SURFACE

(75) Inventors: Klaus Freischlad, Tucson, AZ (US);
Shouhong Tang, Tucson, AZ (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/140,154

(22) Filed: Jun. 16, 2008

(65) Prior Publication Data
US 2008/0304078 A1 Dec. 11, 2008

Related U.S. Application Data

(63) Continuation of application No. 11/260,497, filed on Oct. 26, 2005, now Pat. No. 7,408,649.

(51) Int. Cl.
*G01B 11/02* (2006.01)

(52) U.S. Cl. .................................................... 356/497
(58) Field of Classification Search ......... 356/450–521, 356/397; 702/75–77, 79, 189, 176
See application file for complete search history.

(56) References Cited

U.S. PATENT DOCUMENTS

| | | | |
|---|---|---|---|
| 5,190,614 A * | 3/1993 | Leach et al. | 216/59 |
| 5,398,113 A * | 3/1995 | de Groot | 356/497 |
| 6,545,763 B1 * | 4/2003 | Kim et al. | 356/503 |
| 7,068,376 B2 * | 6/2006 | De Groot | 356/497 |
| 2005/0088663 A1 * | 4/2005 | De Groot et al. | 356/497 |

* cited by examiner

*Primary Examiner*—Tarifur Chowdhury
*Assistant Examiner*—Jonathon D Cook
(74) *Attorney, Agent, or Firm*—Luedeka, Neely & Graham, P.C.

(57) ABSTRACT

In one embodiment, a system to measure defects on a surface of a wafer and an edge of the wafer using a single tool comprises a radial motor to move an optical head in a radial direction to detect defects at locations displaced from the edge of the wafer, and a rotational motor to rotate the optical head around the edge of the wafer to detect defects on the edge of the wafer.

30 Claims, 11 Drawing Sheets

METHOD AND APPARATUS FOR OPTICALLY ANALYZING A SURFACE

RELATED APPLICATIONS

This application is a continuation of U.S. patent application Ser. No. 11/260,497, filed Oct. 26, 2005, entitled Method and Apparatus for Optically Analyzing a Surface, the disclosure of which is incorporated herein by reference in its entirety.

BACKGROUND

The present invention relates to interferometric devices and methods for optically analyzing surfaces, for example, such as the surfaces of semiconductor wafers, semiconductor devices, magnetic surfaces, and the like.

Interferometers are commonly used for testing the shape and topography of surfaces. Good interferometers have height sensitivity in the sub-nanometer range, providing two-dimensional maps in rapid, non-contact operation. A large variety of optical interferometer configurations exist, as well as processing techniques to derive surface topography maps from the measured interferogram intensities.

The fringes of the interferogram are governed by the phase difference between a test beam and a reference beam. The phase of the test beam includes a propagation phase delay and a phase shift on reflection at the surface of a test object or test piece. While the propagation phase is indicative of the test surface height, the phase shift on reflection is affected by the material properties, composition, and surface features of the test piece. Although the variation of the phase shift on reflection is usually considered to be a source of error in the surface topography measurement, additional information about these test object properties carried in the interferograms can be extracted and exploited.

For test surfaces with uniform properties, the phase shift on reflection is constant across the interferogram and only contributes to a constant height offset, like the position alignment of the test piece. It does not affect the surface topography measurement. Examples include a dielectric glass surface, where the phase shift on reflection is pi ($\pi$) radians, or an aluminized mirror surface, where the phase shift is different from $\pi$ but uniform in the interferogram.

For non-uniform test surfaces, the phase shift on reflection varies across the interferogram and hence affects the topography measurements. Examples include read-write head surfaces in magnetic hard disks, where part of the test surface is a dielectric and another part is metallic, or a patterned semiconductor wafer surface in the copper chemical-mechanical-polishing ("CMP") process, where part of the test surface consists of metallic copper and other parts consist of dielectric multilayer film stacks on a silicon wafer.

In integrated circuit manufacturing, the semiconductor switches in the wafer material need to be connected by conductive wiring to obtain functioning circuits. This wiring structure is manufactured in layers by depositing a metal overcoat on the insulating layers that are patterned with vias and trenches, and then removing all excess metal material by CMP. Each metal wiring layer can contain several dielectric insulating layers of different materials such that, in general, the top surface includes metal areas and areas with complex multilayer film stacks.

After the CMP process, only the vias and trenches are filled with metal, thus functioning as conductive paths. Currently, tungsten is commonly used for the first metal layer over the silicon, while higher metal layers mainly use copper. The CMP process exhibits material- and geometry-dependent removal rates, leading to difficulties in obtaining an ideally flat top surface for metal and insulator. One main characteristic of the top surface topography is called "dishing," which refers to the surface height difference by which the metal surface is lower than the surrounding insulator. Another characteristic is called "erosion," which refers to the surface height difference by which insulator material interspersed with metal is lower than solid insulator. Another item of interest in the manufacturing process is the film thickness of the dielectric layers as well as of the metal lines. Furthermore, the width, shape, sidewall angle, or in general the microstructure, of the fine metal lines frequently are of interest.

Currently, the top surface topography of CMP products is measured with tactile stylus tools or atomic-force profilers. The contacting nature of these profilers restricts their usage to special targets in the scribe line between chips. Furthermore, the measurement process is slow because it is inherently a single-point measurement where profiles or two-dimensional maps have to be built up sequentially. The film thickness is measured using spectrophotometers or ellipsometers, which are unable to provide information about the surface topography. The width and shape of fine metal lines, or in general of micro-structures, are measured by atomic-force profilers or scatterometers.

U.S. Pat. No. 6,545,763 to Kim et al. discloses a method for the measurement of surfaces with thin films based on white-light scanning interferometry which extracts a spectral phase distribution from the temporal intensity or time-domain signal by Fourier transform. The spectral phase distribution is then compared with a theoretically generated phase distribution by modeling the measured surface with different properties, such as film thicknesses, refractive indexes, etc. Once the best match is found, the surface properties as well as the surface topography are determined. Difficulties can arise with thinner films using this approach.

The available technology has been limited and in some senses deficient, for example, in that known apparatus and methods are unable to provide fast, non-contact surface topography measurements in the presence of varying phase shifts on reflection. The need also remains for apparatus and methods that can quickly and efficiently measure surface topography as well as surface composition. The term "surface composition" as used herein, broadly construed, means not only the chemical or material composition at the surface or top plane of the object, but other properties and characteristics at or below the surface. It can include, for example, film layers lying at or beneath the surface or top plane of the material, optical properties such as refractive index, surface microstructure, electrical properties such as conductivity or resistivity, and the like.

OBJECTS OF THE INVENTION

Accordingly, an object of the present invention is to provide apparatus and methods that enable non-contact analysis of surfaces quickly and efficiently.

Another object of the present invention is to provide apparatus and methods that effectively and accurately analyze the characteristics of a test object surface.

Another object of the present invention is to provide apparatus and methods that enable one to efficiently analyze characteristics of a test object surface, for example, by reducing the processing demands while obtaining accurate and reliable results.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a method is provided according to one aspect of the invention for analyzing surface characteristics of a test object using broadband light scanning interferometry. The method comprises acquiring data from a scanning interferometry signal from a surface location of a test object, transforming the acquired data to an n-dimensional function comprising an independent frequency variable and an independent time variable, and comparing the transformed n-dimensional function with a set of models to determine a best match from the comparison.

In presently preferred embodiments, n equals 2. In such embodiments, the scanning interferometer may comprise an illuminating numerical aperture and an imaging numerical aperture, and the acquiring of the data may comprise using an illuminating numerical aperture that is smaller than the imaging numerical aperture. Preferably, the illuminating numerical aperture is less than about 0.15.

It is preferred that the transforming of the acquired data to the n-dimensional function comprises creating a spectrogram modified by a weighting function corresponding to desired parameters of interest. It also is preferred that the transforming of the acquired data to the n-dimensional function comprises using a time-frequency transform. The transforming of the acquired data to the n-dimensional function may comprise using a Gabor transform.

It also is preferred that the transforming of the acquired data to the n-dimensional function comprises applying a window function to the interferometry signal. The application of the window function preferably comprises applying multiple windows to the interferometry signal, and more preferably sequentially over time.

The method also preferably comprises dividing the time domain signal into a plurality of time-differentiated segments, and dividing the frequency domain signal into a plurality of time differentiated segments corresponding to the plurality of time differentiated segments of the time domain signal, and the transforming of the acquired data into the n-dimensional function preferably comprises using the plurality of time differentiated segments of the frequency domain signal and the plurality of time differentiated segments of the time domain signal to construct the n-dimensional function as a function of time. The plurality of time differentiated segments of the time domain signal may overlap one another. The plurality of time differentiated segments of the frequency domain signal also may overlap one another.

In preferred implementations of this method, the acquiring of the data from the scanning interferometry signal may comprise spectral shaping of the interferometric signal. The acquiring of the data from the scanning interferometry signal thus may comprise using light having an original light spectrum, and the method may further comprise modifying the original light spectrum to facilitate the comparing of the n-dimensional function with the set of models to determine the best match from the comparison. The modification of the original light spectrum also may comprise using optical components to modify the original light spectrum. The modification of the original light spectrum also may comprise using an optical filter comprising a selected transmittance function.

The modification of the original light spectrum also may comprise using a programmable filter.

The method according to this aspect of the invention preferably comprises using a processor to modify the interferometry signal to facilitate the comparing of the n-dimensional function with the models.

In accordance with another aspect of the invention, a method is provided for analyzing surface characteristics of a test object using broadband light scanning interferometry. The method comprises acquiring data from a scanning interferometry signal from a surface location of a test object, transforming the acquired data to an n-dimensional function having an independent scale variable and an independent time variable, and comparing the transformed n-dimensional function with a set of stored n-dimensional function models to determine a best match from the comparison.

In presently preferred implementations of this method, n equals 2. Also in such implementations, the scanning interferometer may comprise an illuminating numerical aperture and an imaging numerical aperture, and the acquiring of the data may comprise using an illuminating numerical aperture that is smaller than the imaging numerical aperture. The illuminating numerical aperture preferably is less than about 0.15.

In presently preferred implementations, the transforming of the acquired data to the n-dimensional function preferably comprises creating a scalogram modified by a weighting function corresponding to desired parameters of interest. The transforming of the. acquired data to the n-dimensional function also may comprise using a time-scale transform. The transforming of the. acquired data to the n-dimensional function preferably comprises using a wavelet transform.

The transforming of the acquired data to the n-dimensional function also preferably comprises applying a window function to the interferometry signal. The application of the window function may and preferably does comprise applying multiple windows to the interferometry signal. The application of the multiple windows also preferably comprises applying the multiple windows sequentially over time.

In presently preferred implementations, the method further comprises dividing the time domain signal into a plurality of time-differentiated segments, and dividing the scale domain signal into a plurality of time differentiated segments corresponding to the plurality of time differentiated segments of the time domain signal, and the transforming of the acquired data into the n-dimensional function comprises using the plurality of time differentiated segments of the scale domain signal and the plurality of time differentiated segments of the time domain signal to construct the n-dimensional function as a function of time. The plurality of time differentiated segments of the time domain signal may overlap one another, as may the plurality of time differentiated segments of the scale domain signal.

In presently preferred implementations of the method according to this aspect of the invention, the acquiring of the data from the scanning interferometry signal may comprise spectral shaping of the interferometry signal. Thus, the acquiring of the data from the scanning interferometry signal may comprise using light having an original light spectrum, and the method further may comprise modifying the original light spectrum to facilitate the comparing of the n-dimensional function with the set of stored models. The modification of the original light spectrum may comprise using an optical filter comprising a selected transmittance function. The optical filter may comprise a programmable filter. Preferred implementations of this method may comprise using a processor to modify the interferometry signal to facilitate the comparing of the n-dimensional function with the models.

In accordance with another aspect of the invention, a method is provided for analyzing a surface of a test object. The method comprises using an interferometry system comprising a broadband light beam to scan the surface of the test object and to thereby generate an interferometry signal comprising a time domain signal, applying a window function to the interferometry signal to obtain a windowed interferometry signal, obtaining a frequency domain signal from the windowed interferometry signal, and constructing a multi-domain function from the frequency domain signal and the time domain signal.

In presently preferred implementations of the method according to this aspect of the invention, the multi-domain function comprises a 2-domain function. In such implementations, the application of the window function preferably comprises applying multiple windows to the interferometry signal. The application of the multiple windows comprises applying the multiple windows sequentially over time.

The method preferably comprises using of the interferometry system to scan the surface of the test object, which preferably comprises vertically scanning a position on the surface of the test object and generating the interferometry signal and the time domain signal at selected unique times during the vertical scanning, and the dividing of the time domain signal into the plurality of time-differentiated segments. The time-differentiated segments of the plurality of time-differentiated segments preferably are equally spaced from one another in time. The dividing of the time domain signal into the plurality of time-differentiated segments preferably comprises dividing the vertical scan into a corresponding plurality of vertical scan segments, wherein the vertical scan segments are of equal length.

The method according to this aspect of the invention preferably further comprises dividing the time domain signal into a plurality of time-differentiated segments, and dividing the frequency domain signal into a plurality of time differentiated segments corresponding to the plurality of time differentiated segments of the time domain signal, wherein the construction of the multi-domain function comprises using the plurality of time differentiated segments of the frequency domain signal and the plurality of time differentiated segments of the time domain signal to construct the multi-domain function as a function of time. The plurality of time differentiated segments of the time domain signal preferably overlap one another, and the plurality of time differentiated segments of the frequency domain signal also overlap one another.

Methods according to this aspect of the invention also preferably comprise comparing the multi-domain function with a set of models to determine a best match from the comparison.

The test object in many instances may be assumed to comprise m top layers and n bottom layer. In such instances, such methods also preferably comprise the use of the interferometry system to cause the broadband light beam to comprise a spectral composition that facilitates obtaining the frequency domain signal for the m top layers of the test object while disfavoring obtaining the frequency domain signal for the n bottom layers of the test object. The use of the interferometry system also may comprise causing the broadband light beam to comprise a spectral composition such that the frequency domain signal for the m top layers of the test object is distinguishable from the frequency domain signal for the n bottom layers of the test object.

The broadband light beam typically will comprise amplitude components, in which case the causing of the broadband light beam to comprise a spectral composition that facilitates obtaining the frequency domain signal for the m top layers of the test object while disfavoring obtaining the frequency domain signal for the n bottom layers of the test object may comprise modifying the spectral composition based on the amplitude components. The use of the interferometry system to cause the broadband light beam to comprise a spectral composition that facilitates obtaining the frequency domain signal for the m top layers of the test object while disfavoring obtaining the frequency domain signal for the n bottom layers of the test object also may comprise causing the broadband light source to have an original light spectrum that includes the spectral composition. The use of the interferometry system to cause the broadband light beam to comprise a spectral composition that facilitates obtaining the frequency domain signal for the m top layers of the test object while disfavoring obtaining the frequency domain signal for the n bottom layers of the test object also may comprise using spectral shaping optics positioned within the broadband light beam to spectrally shape the broadband light beam to obtain the spectral composition. The use of the interferometry system to cause the broadband light beam to comprise the spectral composition that facilitates obtaining the frequency domain signal for the m top layers of the test object while disfavoring obtaining the frequency domain signal for the n bottom layers of the test object also may comprise using means positioned within the broadband light beam for spectrally shaping the broadband light beam to obtain the spectral components.

Where the test object comprises m top layers and n bottom layers, the obtaining of the frequency domain signal from the interferometry signal may comprise using a processor to spectrally shape the interferometry signal to comprise a spectral composition that facilitates obtaining the frequency domain signal for the m top layers of the test object while disfavoring obtaining the frequency domain signal for the n bottom layers of the test object. The obtaining of the frequency domain signal from the interferometry signal also may comprise using a processor to cause the interferometry signal to comprise a spectral composition such that the frequency domain signal for the m top layers of the test object is distinguishable from the frequency domain signal for the n bottom layers of the test object.

In accordance with another aspect of the invention, an apparatus is provided for analyzing surface characteristics of a test object. The apparatus comprises a scanning interferometry system for generating an interferometry signal from a surface location of a test object, and a processor that transforms the acquired data to an n-dimensional function comprising an independent frequency variable and an independent time variable, and that compares the transformed n-dimensional function with a set of models to determine a best match from the comparison. In accordance with another aspect of the invention, an apparatus is provided for analyzing surface characteristics of a test object. The apparatus comprises a scanning interferometry system that generates a scanning interferometry signal from a surface location of a test object, and a processor that transforms the acquired data to an n-dimensional function having an independent scale variable and an independent time variable, and that compares the transformed n-dimensional function with a set of stored n-dimensional function models to determine a best match from the comparison.

In accordance with another aspect of the invention, an apparatus is provided for analyzing a surface of a test object. The apparatus comprises a scanning interferometry system that generates an interferometry signal from the surface of the test object, wherein the interferometry signal comprises a time domain signal, and a processor that receives the interferometry signal, uses the interferometry signal to generate a frequency domain signal, and uses the time domain signal and the frequency domain signal to construct a multi-domain function that comprises information from the frequency domain signal and the time domain signal.

In presently preferred embodiments of each of these aspects of the invention, n preferably equals 2.

In such embodiments, the processor preferably further comprises means for applying a window function to the interferometry signal, and more preferably the processor further comprises means for applying a window function comprising multiple windows to the interferometry signal. The processor preferably further comprises means for applying a window function comprising multiple windows, wherein the multiple windows are applied sequentially over time.

In presently preferred embodiments, the scanning interferometry system comprises means for vertically scanning a position on the surface of the test object, and the processor comprises means for dividing the time domain signal into a plurality of time-differentiated segments and dividing the frequency domain signal into a plurality of time differentiated segments corresponding to the plurality of time differentiated segments of the time domain signal, and function generating means for using the plurality of time differentiated segments of the frequency domain signal and the plurality of time differentiated segments of the time domain signal to construct the multi-domain function as a function of time. Preferably, the means for dividing the time domain signal into a plurality of time-differentiated segments and dividing the frequency domain signal into a plurality of time differentiated segments spaces the time-differentiated segments so that each of the time differentiated segments has an equal time duration. The means for dividing the time domain signal into a plurality of time-differentiated segments and dividing the frequency domain signal into a plurality of time differentiated segments preferably spaces the time-differentiated segments so that each of the time differentiated segments has an equal length. The means for dividing the time domain signal into a plurality of time-differentiated segments and dividing the frequency domain signal into a plurality of time differentiated segments also preferably divides the plurality of time differentiated segments of the time domain signal so that the time differentiated segments overlap one another. In addition, it is preferred that the means for dividing the time domain signal into a plurality of time-differentiated segments and dividing the frequency domain signal into a plurality of time differentiated segments divides the plurality of time differentiated segments of the frequency domain signal so that the time differentiated segments of the frequency domain signal overlap one another.

In presently preferred embodiments of these apparatus, and where the test object can be assumed to comprise m top layers and n bottom layers, the processor comprises means for spectrally shaping the multi-spectral light beam to cause the interferometry signal to comprise a spectral composition that facilitates obtaining the frequency domain signal for the m top layers of the test object while disfavoring obtaining the frequency domain signal for the n bottom layers of the test object. Similarly, in each such embodiment, the processor may comprise means for causing the interferometry signal to comprise a spectral composition such that the frequency domain signal for the m top layers of the test object is distinguishable from the frequency domain signal for the n bottom layers of the test object.

In presently preferred embodiments of these apparatus, the processor preferably comprises means for comparing the n-dimensional function with a set of n-dimensional function models to determine a best match from the comparison. The processor preferably comprises comparing the multi-domain function with a set of multi-domain function models to determine a best match from the comparison.

Such apparatus also may comprise a display operatively coupled to the processor that displays the output as a three dimensional graph comprising a first orthogonal axis representing the time domain signal, a second orthogonal axis representing the frequency domain signal, and a third orthogonal axis representing an amplitude of the n-dimensional and/or multi-domain signal.

Such apparatus also may comprise a storage device for storing a plurality of models corresponding respectively to a plurality of test object conditions.

In accordance with another aspect of the invention, an apparatus is provided for analyzing a surface of a test object. The apparatus comprises means for acquiring data from a scanning interferometry signal from a surface location of a test object, and means for transforming the acquired data to an n-dimensional function comprising an independent frequency variable and an independent time variable, and means for comparing the transformed n-dimensional function with a set of models to determine a best match from the comparison.

In accordance with another aspect of the invention, an apparatus is provided for analyzing surface characteristics of a test object. The apparatus comprises means for acquiring data from a scanning interferometry signal from a surface location of a test object, means for transforming the acquired data to an n-dimensional function having an independent scale variable and an independent time variable, and means for comparing the transformed n-dimensional function with a set of n-dimensional function models to determine a best match from the comparison.

In accordance with still another aspect of the invention, an apparatus is provided for analyzing a surface of a test object, wherein the apparatus comprises means for generating an interferometry signal from the surface of the test object, wherein the interferometry signal comprises a time domain signal, and means for using the interferometry signal to generate a frequency domain signal and for generating a multi-domain function using the time domain signal and the frequency domain signal.

In each of the aforementioned apparatus, it is preferred that n equals 2.

The means for using the interferometry signal to generate a frequency domain signal and for generating a multi-domain function using the time domain signal and the frequency domain signal further may comprise means for applying a window function to the interferometry signal. The means for using the interferometry signal to generate a frequency domain signal and for generating a multi-domain function using the time domain signal and the frequency domain signal also further may comprise means for applying a window function comprising multiple windows to the interferometry signal. The means for using the interferometry signal to generate a frequency domain signal and for generating a multi-domain function using the time domain signal and the frequency domain signal also may further comprise means for applying a window function comprising multiple windows, wherein the multiple windows are applied sequentially over time.

The means for using the interferometry signal to generate a frequency domain signal and for generating a multi-domain function using the time domain signal and the frequency domain signal preferably further comprises means for dividing the time domain signal into a plurality of time-differentiated segments and for dividing the frequency domain signal into a plurality of time differentiated segments corresponding to the plurality of time differentiated segments of the time domain signal, and means for generating the multi-domain function using the plurality of time differentiated segments of the frequency domain signal and the plurality of time differentiated segments of the time domain signal so that the multi-domain is a function of time.

Each of the aforementioned means for processing preferably comprise a computer such as a commercially available general purpose computer, programmed to carry out the functions described herein above. Other means of course may be used, for example, such as a dedicated processor, a system or network of computers, and the like.

Each of these apparatus also may and preferably do comprise means for comparing the multi-domain function to a plurality of models to select a best match of the models with the multi-domain function. Such means also preferably comprise a general purpose computer with appropriate programming as described herein above, or the like.

Each of these apparatus further may comprises display means for displaying the multi-domain function as a three dimensional graph comprising a first orthogonal axis representing the time domain signal, a second orthogonal axis representing the frequency domain signal, and a third orthogonal axis representing an amplitude of the multi-domain function. They also preferably comprise means for storing a plurality of models corresponding respectively to a plurality of test object conditions.

In accordance with another aspect of the invention, an apparatus is provided for processing an interferometry signal from an analysis of a test object by a scanning interferometry system. The apparatus according to this aspect of the invention comprises a processor that transforms the acquired data to an n-dimensional function comprising an independent frequency variable and an independent time variable, and that compares the transformed n-dimensional function with a set of models to determine a best match from the comparison.

In accordance with a related aspect of the invention, an apparatus is provided for processing an interferometry signal from an analysis of a test object by a scanning interferometry system. The apparatus comprises a processor that transforms the acquired data to an n-dimensional function having an independent scale variable and an independent time variable, and that compares the transformed n-dimensional function with a set of stored n-dimensional function models to determine a best match from the comparison.

In accordance with another related aspect of the invention, an apparatus is provided for processing an interferometry signal from an analysis of a test object by a scanning interferometry system, wherein the interferometry signal comprises a time domain signal. The apparatus comprises a processor that uses the interferometry signal to generate a frequency domain signal and that uses the time domain signal and the frequency domain signal to construct a multi-domain function that comprises information from the frequency domain signal and information from the time domain signal.

The apparatus according to these aspects of the invention preferably further comprise means for applying a window function to the interferometry signal, and more preferably comprise means for applying a window function comprising multiple windows to the interferometry signal. Preferably they comprise applying the multiple windows sequentially over time.

Preferred embodiments of these apparatus also preferably comprise means for dividing the time domain signal into a plurality of time-differentiated segments and dividing the frequency domain signal into a plurality of time differentiated segments corresponding to the plurality of time differentiated segments of the time domain signal, means for using the plurality of time differentiated segments of the frequency domain signal and the plurality of time differentiated segments of the time domain signal to construct the multi-dimensional function as a function of time. The dividing means preferably spaces the time-differentiated segments so that each of the time differentiated segments has an equal time duration. The dividing means also preferably spaces the time-differentiated segments so that each of the time differentiated segments has an equal length. The dividing means preferably divides the plurality of time differentiated segments of the time domain signal so that the time differentiated segments overlap one another, and so that the time differentiated segments of the frequency domain signal overlap one another.

In each of these apparatus, the processor preferably comprises means for spectrally shaping the broadband light beam to cause the interferometry signal to comprise a spectral composition that facilitates obtaining the frequency domain signal for the m top layers of the test object while disfavoring obtaining the frequency domain signal for the n bottom layers of the test object. The processor also preferably comprises means for causing the interferometry signal to comprise a spectral composition such that the frequency domain signal for the m top layers of the test object is distinguishable from the frequency domain signal for the n bottom layers of the test object.

These apparatus also preferably further comprise means for comparing the multi-domain function with a set of models to determine a best match from the comparison. The output preferably comprises means for outputting the multi-domain function as a three dimensional graph comprising a first orthogonal axis representing the time domain signal, a second orthogonal axis representing the frequency domain signal, and a third orthogonal axis representing an amplitude of the multi-domain signal.

Each of these aspects of the invention and the related means for processing and outputting the date, the means as described herein above preferably comprise a general purpose computer programmed to carry out these functions, or similar processing devices as referred to herein above.

These apparatus preferably further comprise a display generator that generates a display of the multi-domain function as a three dimensional graph that comprises a first orthogonal axis representing a time component from the time domain signal, a second orthogonal axis representing a frequency component from the frequency domain signal, and a third orthogonal axis representing an amplitude of the multi-domain signal.

They also preferably comprise a storage device operatively coupled to the processor for storing a plurality of models corresponding respectively to a plurality of test object conditions, and the processor preferably comprises comparing means, such as the general purpose computer, for comparing the multi-domain function to the plurality of models to select a best match. Preferably, the storage device stores at least one parameter for each of the plurality of models, the processor comprises means for generating at least one test object parameter for the test object from the multi-domain function, and the comparing means compares the at least one parameter from the multi-dimensional function to at least one parameter of the plurality of models to select an optimal one of the models.

In accordance with yet another aspect of the invention, a machine readable medium is provided. The medium comprises a program that causes the machine to use a scanning interferometry system to generate an interferometry signal from a surface location of a test object, wherein the program causes the machine to transform the acquired data to an n-dimensional function comprising an independent frequency variable and an independent time variable, and wherein the program causes the machine to compare the transformed n-dimensional function with a set of models to determine a best match from the comparison.

In accordance with a related aspect of the invention, a machine readable medium is provided, wherein the medium comprises a program that causes the machine to use a scanning interferometry system to generate a scanning interferometry signal from a surface location of a test object, wherein the program causes the machine to transform the acquired data to an n-dimensional function having an independent scale variable and an independent time variable, and wherein the program causes the machine to compare the transformed n-dimensional function with a set of stored n-dimensional function models to determine a best match from the comparison.

In accordance with still another aspect of the invention, a medium readable by a machine is provided. The medium comprises a program that causes the machine to use an interferometry signal comprising a time domain signal from a broadband interferometry system, which interferometry signal is obtained from a test surface, wherein the program causes the machine to use the interferometry signal to generate a frequency domain signal, wherein the program causes the machine to use the time domain signal and the frequency domain signal to construct a multi-domain function that comprises information from the time domain signal and the frequency domain signal, and wherein the program causes the machine to use the multi-domain function to obtain information useful in characterizing the surface of the test object.

In presently preferred embodiments of each of these machine readable medium aspects of the invention, n preferably is equal to 2.

In presently preferred embodiments of each of these aspects of the invention, the program preferably further comprises means for causing the machine to apply a window function to the interferometry signal. The program also preferably further comprises means for causing the machine to apply a window function comprising multiple windows to the interferometry signal. The program further may comprise means for causing the machine to apply a window function comprising multiple windows to the interferometry signal, wherein the multiple windows are applied sequentially over time. Such means in both instances may comprise computer code constructed to cause these functions to be performed by a processor, such as the processor of a general purpose computer. The program also may comprise means for causing the machine to divide the time domain signal into a plurality of time-differentiated segments and to divide the frequency domain signal into a plurality of time differentiated segments corresponding to the plurality of time differentiated segments of the time domain signal, means for causing the machine to use the plurality of time differentiated segments of the frequency domain signal and the plurality of time differentiated segments of the time domain signal to construct the multi-domain function as a function of time. Such means again may comprise computer code for causing the processor to perform these functions. The dividing means preferably spaces the time-differentiated segments so that each of the time differentiated segments has an equal time duration. The dividing means also may cause the machine to space the time-differentiated segments so that each of the time differentiated segments has an equal length. The dividing means also may cause the machine to divide the plurality of time differentiated segments of the time domain signal so that the time differentiated segments overlap one another. The dividing means preferably causes the machine to divide the plurality of time differentiated segments of the frequency domain signal so that the time differentiated segments of the frequency domain signal overlap one another.

The program also preferably comprises means for causing the machine to spectrally shape the broadband light beam to cause the interferometry signal to comprise a spectral composition that facilitates obtaining the frequency domain signal for the m top layers of the test object while disfavoring obtaining the frequency domain signal for the n bottom layers of the test object. The program also may comprise means for causing the machine to cause the interferometry signal to comprise a spectral composition such that the frequency domain signal for the m top layers of the test object is distinguishable from the frequency domain signal for the n bottom layers of the test object. These means may comprise computer code that controls a device for filtering or otherwise modifying the optics of the interferometry system, and/or computer code that operates within the processor to modify the interferometry signal to accomplish these functions, and the like.

The program also preferably further comprises means for causing the machine to compare the multi-domain function with a set of models to determine a best match from the comparison. These means also preferably comprise computer code that causes the processor to perform these functions.

The program also may comprise means for causing the machine to output the multi-domain function as a multi-domain graph and/or multi-domain display. Such means also preferably comprise suitable computer code for operating in conjunction with the processor to cause such output. The program preferably comprises a first program component that generates the multi-domain display as a three dimensional graph that comprises a first orthogonal axis representing a time component from the time domain signal, a second orthogonal axis representing a frequency component from the frequency domain signal, and a third orthogonal axis representing an amplitude of the n-dimensional function and/or the multi-domain function. The program also preferably comprises a second program component that compares the n-dimensional function and/or the multi-domain function to a plurality of models corresponding respectively to a plurality of test object conditions and selects the best one of the models.

In accordance with another aspect of the invention, a method is provided for analyzing a surface of a test object. The method comprises using an interferometry system comprising a broadband light beam to scan the surface of the test object and to thereby generate an interferometry signal comprising a time domain signal, applying a window function to the interferometry signal to obtain a windowed interferometry signal, and characterizing the surface of the test object using the windowed interferometry signal.

The application of the window function preferably comprises applying multiple windows to the interferometry signal. The application of the multiple windows comprises applying the multiple windows sequentially over time.

In presently preferred implementations of the method, the using of the interferometry system to scan the surface of the test object comprises vertically scanning a position on the surface of the test object and generating the interferometry signal and the time domain signal at selected unique times during the vertical scanning, and the dividing of the time domain signal into the plurality of time-differentiated segments. The time-differentiated segments of the plurality of time-differentiated segments preferably are equally spaced from one another in time. The dividing of the time domain signal into the plurality of time-differentiated segments also preferably comprises dividing the vertical scan into a corresponding plurality of vertical scan segments, wherein the vertical scan segments are of equal length.

The method also may further comprise dividing the time domain signal into a plurality of time-differentiated segments, and dividing the frequency domain signal into a plurality of time differentiated segments corresponding to the plurality of time differentiated segments of the time domain signal, wherein the characterization of the surface of the test object comprises using the plurality of time differentiated segments of the frequency domain signal and the plurality of time differentiated segments of the time domain signal to characterize the surface of the test object.

The plurality of time differentiated segments of the time domain signal preferably overlap one another, and the plurality of time differentiated segments of the frequency domain signal also preferably overlap one another.

In accordance with another aspect of the invention, an apparatus is provided for analyzing a surface of a test object. The apparatus comprises a scanning interferometry system that generates a windowed interferometry signal from the surface of the test object.

The scanning interferometry system preferably generates the windowed interferometry signal to comprise multiple windows. The scanning interferometry system also preferably generates windows of the windowed interferometry signal sequentially over time.

In accordance with another aspect of the invention, an apparatus is provided for analyzing a surface of a test object. The apparatus according to this aspect of the invention comprises a scanning interferometry system that generates an interferometry signal from the surface of the test object, and a processor that applies a window function to the interferometry signal.

The processor preferably applies the window function to comprise multiple windows to the interferometry signal, and the processor preferably applies each of the windows sequentially over time.

In presently preferred embodiments according to this aspect of the invention, the scanning interferometry system comprises means for vertically scanning a position on the surface of the test object, and the processor comprises means for dividing the interferometry signal into a plurality of time-differentiated segments. The means for vertically scanning may comprise one or more devices for moving the test object surface relative to the reference surface, directly or indirectly the means for dividing the interferometry signal into the plurality of time-differentiated segments may comprise framing hardware or software associated with a camera, an associated processor, or both. The means for dividing the interferometry signal into a plurality of time-differentiated segments preferably spaces the time-differentiated segments so that each of the time differentiated segments has an equal time duration. The means for dividing the interferometry signal into a plurality of time-differentiated segments also preferably spaces the time-differentiated segments so that each of the time differentiated segments has an equal length. The means for dividing the interferometry signal into a plurality of time-differentiated segments also preferably divides the plurality of time differentiated segments so that the time differentiated segments overlap one another.

These aspects of the invention can provide apparatus and methods that enable one to determine the surface topography of structured surfaces in the presence of varying phase shift on reflection. The phase shift on reflection may be due to material properties of bulk surfaces, single or multi-layer film stacks on a substrate, and/or micro-structures on a substrate or as part of a film stack. The invention also can provide apparatus and methods capable of simultaneously or separately determining additional parameters of the test object, e.g., layer thickness and/or material refractive index for film stacks, or line width and structure depth of micro-structures.

BRIEF DESCRIPTION OF THE DRAWINGS

The accompanying drawings, which are incorporated in and constitute a part of the specification, illustrate a presently preferred embodiments and methods of the invention and, together with the general description given above and the detailed description of the preferred embodiments and methods given below, serve to explain the principles of the invention. Of the drawings.

DETAILED DESCRIPTION OF THE PREFERRED EMBODIMENTS AND METHODS

Figure 1:
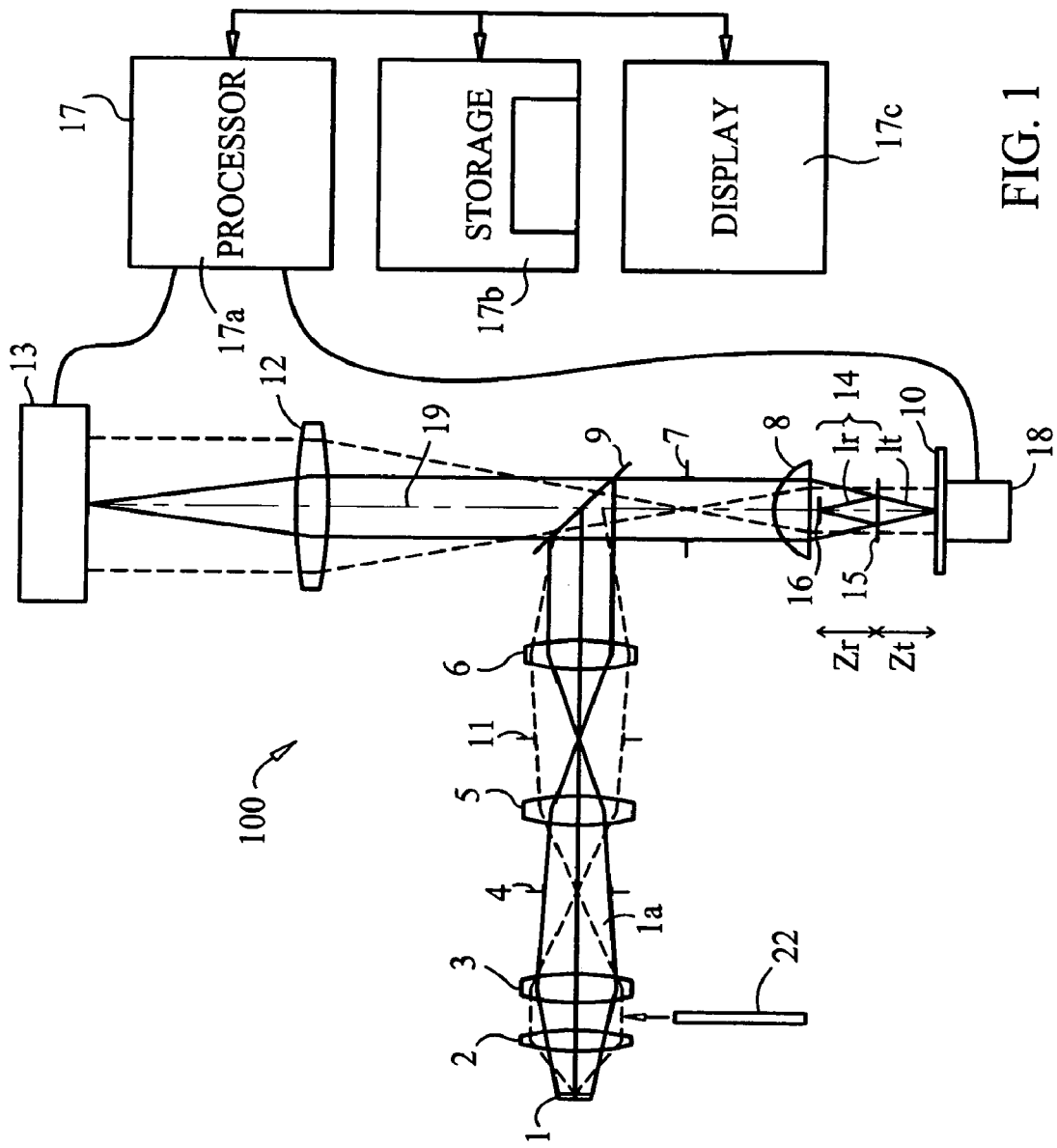
FIG. 1 is a block diagram of an interferometer according to a presently preferred embodiment of one aspect of the invention, and is used herein to illustrate a presently preferred implementation of a method according to another aspect of the invention.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

The embodiments and methods of this invention are useful for optically analyzing test objects, also referred to herein as test pieces, and more preferably the surfaces of test objects, particularly at high magnifications or resolutions. Examples of test objects would include, without limitation, semiconductor wafers, semiconductor devices, magnetic disk drives, and the like. The term "surface" as the term is used herein refers in its broadest sense not only to the top or external surface or plane, but typically to the subsurface as well. In the semiconductor field, for example, the surface may include one or more film layers, such as dielectric films, metallization, and the like.

In accordance with various aspects of the invention, an apparatus is provided for analyzing surface characteristics of a test object. As noted herein above, such apparatus preferably analyze not only the top surface or plane, but the subsurface structure as well. The analysis preferably comprises not only height and/or topology of the surface, but subsurface characteristics as well, for example, such as surface or film composition, e.g., the number of films on the surface, their respective thicknesses, compositions, refractive index, etc.

In the various preferred embodiments and preferred method implementations, or in connection with them, a scanning interferometry system is provided for scanning the surface of the test object with an optical beam and generating an interferometric signal embodying information about the surface of the test object.

Generally in interferometers for optical surface analysis, the illuminating beam is split into a reference beam and a test beam. The two beams are reflected by the reference surface and the test surface respectively, recombined to form an interferometric signal, and relayed to a camera sensing the interferograms. The camera signal is digitized and further analyzed in a computer. During the data acquisition, the optical path difference ("OPD") between the reference beam and test beam is varied while a number of camera frames are acquired. From the acquired interferogram intensities in each camera frame, the surface height at test surface points conjugate to the detector elements (pixels) of the camera is calculated, and a two-dimensional surface topography map is generated.

A variety of interferometer types are commonly used in interferometric surface metrology, e.g., Fizeau, Twyman-Green, Mach-Zehnder. (D. Malacara ed., Optical Shop Testing, 2nd Edition, John Wiley, NY 1992.) Specialized microscopic interferometer types include the Mirau, Michelson, and Linnik. (W. Krug, J. Rienitz, G. Schulz, Contributions to Interference Microscopy, Hilger & Watts, London, 1964.) Other than the Fizeau-interferometer, all of these interferometer types can be used with broadband illumination at an appreciable working distance between the test surface and the interferometer components. This is due to the fact that the OPD between test and reference beam can be adjusted to zero for a non-zero spacing between the test surface and the beam splitter. The methods and techniques according to the various aspects of the invention as disclosed herein below generally can be applied to all interferometer types in which a broadband or multi-spectral light beam can be used to obtain an interference signal. The presently preferred embodiments and presently preferred method implementations according to the various aspects of the invention as described herein below are based primarily on the Mirau interference microscope shown in FIG. 1 to better illustrate these aspects of the invention, although this is not necessarily intended to be limiting.

The Interferometry System (Hardware) of FIG. 1

To illustrate the principles of the invention according to its various aspects, a schematic of a scanning interferometry system in the form of a Mirau-based interference microscope or interferometer 100 according to a presently preferred embodiment of one aspect of the invention is shown in FIG. 1. This interferometer 100 is adapted to analyze the surface topology and other characteristics of a test object or piece 10, which may comprise a semiconductor wafer, a semiconductor device, or other item.

Interferometer 100 includes a light source 1 that projects an optical beam 1a. Light source 1 preferably comprises a multi-spectral light source, i.e., comprising multiple frequency components. More preferably, light source 1 provides broadband light, such as white light, emitted at a range of wavelengths. "Broadband" as used herein is used according to its common meaning in the optics and optical engineering field. Typically it is meant to include light having wavelength components of at least about 100 nanometers ("nm") range. A preferred embodiment for a light source with broadband light in the visible wavelength range would comprise a halogen lamp. Optical beam 1a as it is projected from light source 1 comprises white light.

Beam 1a is imaged by lenses 2 and 3 onto an aperture stop 4. The light passing through the aperture stop 4 is imaged by lenses 5 and 6 onto a stop 7 of a microscope objective 8 after being partially reflected by a beam splitter 9. For the common telecentric microscope objectives, this objective stop 7 is in the rear focal plane of the objective, such that the light source is imaged to infinity in the object space where test surface 10 is situated. A field stop 11 is positioned between lenses 5 and 6, such that it is imaged to infinity by lens 6, and in turn imaged onto the test surface 10 by the microscope objective 8. The test surface 10 is then imaged by the microscope objective 8 and a tube lens 12 onto a camera 13, with the beam now being partially transmitted by beam splitter 9. Thus the microscope comprises two complementary imaging trains, i.e., the test surface imaging, shown in solid lines in FIG. 1, and the pupil imaging (or source imaging), shown in dashed lines in that same figure.

A Mirau adapter 14 is placed between objective 8 and test surface 10. It includes an interferometric beam splitter 15 and a reference surface 16. The distance between the reference surface 16 and the beam splitter 15 is $z_r$, and the distance between the test surface 10 and the beam splitter 15 is $z_t$.

In accordance with this aspect of the invention, the system comprises processing means that performs processing on the interferometry signal as described more fully herein below. The processing means preferably but optionally comprises a processor, for example, such as a microcontroller or the processor of a general purpose computer, programmed and/or otherwise configured to perform the tasks and functions as described more fully herein below. The processor and/or the processing means may comprise more than one actual processing devices, such as multiple central processing units ("CPU") in a distributed processing environment, or wherein the signal is processed in more than one piece of equipment. Indeed, the processor itself thus configured comprises an aspect of the invention as well. The processor also may comprise peripheral devices, for example, such as a keyboard, mouse, track ball, and the like. As implemented in the presently preferred embodiments and method implementations, the processing means comprises a processor in the form of a general purpose computer 17, which in turn comprises a processing unit 17a such as a tower containing a motherboard or similar circuitry including an arithmetic logic unit, random access memory, etc. Processor 17 is operatively (i.e., directly or indirectly) coupled to camera 13 to receive the interferometry signal, which is digitized, for example, by camera 13, processor 17 or some combination of these.

The system also preferably comprises storage means for storing the interferometry signal, transformations of it, data from it, a plurality of models corresponding respectively to a plurality of surface conditions of the test object, and/or results of comparisons of the models with the interferometry signal or representations of it, and/or the program or programs used to generate these quantities. The storage means may comprise any device or group of devices capable of performing the storage functions as described herein. Storage devices compatible with processor 17 include, for example, a hard drive, a disk drive, and similar commercially available digital storage media. The storage devices comprise or are adapted to operate with a machine readable storage medium, such as a magnetic or optical storage medium. Examples of such storage media include solid state memory, magnetic hard drives, diskettes, compact disks ("CD"), DVDs, jump drives, optical storage disks, and the like. In system 100, the storage means comprises a mass storage device 17b, such as a hard drive. Storage device 17b also preferably comprises a removable storage device, such as a disk drive, jump drive, or the like.

The system also may comprise display means for displaying certain functions, as are more specifically described herein. The display means may comprise any display device capable of providing the display functions as described herein, preferably in cooperation with the processor. As implemented in the presently preferred embodiments and method implementations, the display means comprises a computer monitor 17c operatively (i.e., directly or indirectly) coupled to processor 17 to display the data and functions as described more fully herein below.

In accordance with presently preferred method implementations of the invention, the scanning interferometry system is used to acquire data from the surface of the test object. In so doing, light source 1 is used to scan a surface location of test object 10 as more fully described herein. The scan may occur at a single surface location, or more preferably, the scan occurs sequentially at one surface location, then another, and another until the desired portions of the surface have been scanned. This may or may not include the entire surface, depending on the application, the desired amount of testing, etc.

In scanning the surface location of the test object, the illuminating beam 1a is split into a reference beam 1r and the test beam 1t by the interferometric beam splitter 15. The reference beam 1r is the beam portion that is directed toward the reference surface 16, where it is reflected back to beam splitter 15. The test beam 1t is the beam portion that is directed to the test surface 10, where it is reflected to beam splitter 15. At beam splitter 15, both beams recombine, and continue propagating through the objective 8, beam splitter 9, and tube lens 12 to camera 13 where they form an interference pattern. At each detector element (pixel) of the camera 13 this interference pattern is transformed in camera 13 and/or its associated circuitry into an interferometry signal. This interferometry signal comprises or embodies a time domain signal, which can be viewed as an intensity versus time representation of the interferometry signal.

It is preferred in connection with the presently preferred embodiments and methods that the scanning of the surface comprise not only varying the OPD in a direction substantially normal to the test surface (here assumed to be "vertical" or in the "z" direction), but also in dividing this vertical scan into a plurality of sequential segments, preferably equal in time and in length. This causes the interferometry signal, as well as the corresponding time domain and frequency domain representations of it, to be divided into a plurality of time-differentiated segments, wherein the time domain segments and the frequency domain segments correspond to one another in time.

During data acquisition and for a given spot or location on the surface of test piece 10, the OPD between the test beam it and reference beam 1r is varied while the frames from camera 13 are acquired by processing computer 17 for processing. The OPD variation optionally but preferably is controlled by computer 17 to affect uniform steps in $z_t$ between camera frames. The test piece is supported by a piezoelectric transducer ("PZT") actuator 18 which elongates along the optical axis 19 according to a control voltage from computer 17 or an intermediate amplifier providing the required high-voltage signal for the PZT actuator. Alternatively, objective 8 together with the Mirau adapter 14 may be attached to a PZT actuator controlled by computer 17. For other interferometer configurations, the PZT actuator 18 can be placed differently to utilize the different possibilities of the different optical configurations. For example, it can be placed to move the test surface or the reference surface in a Michelson or Linnik interferometer, or the reference objective together with the reference surface in case of a Linnik interferometer.

Figure 2:
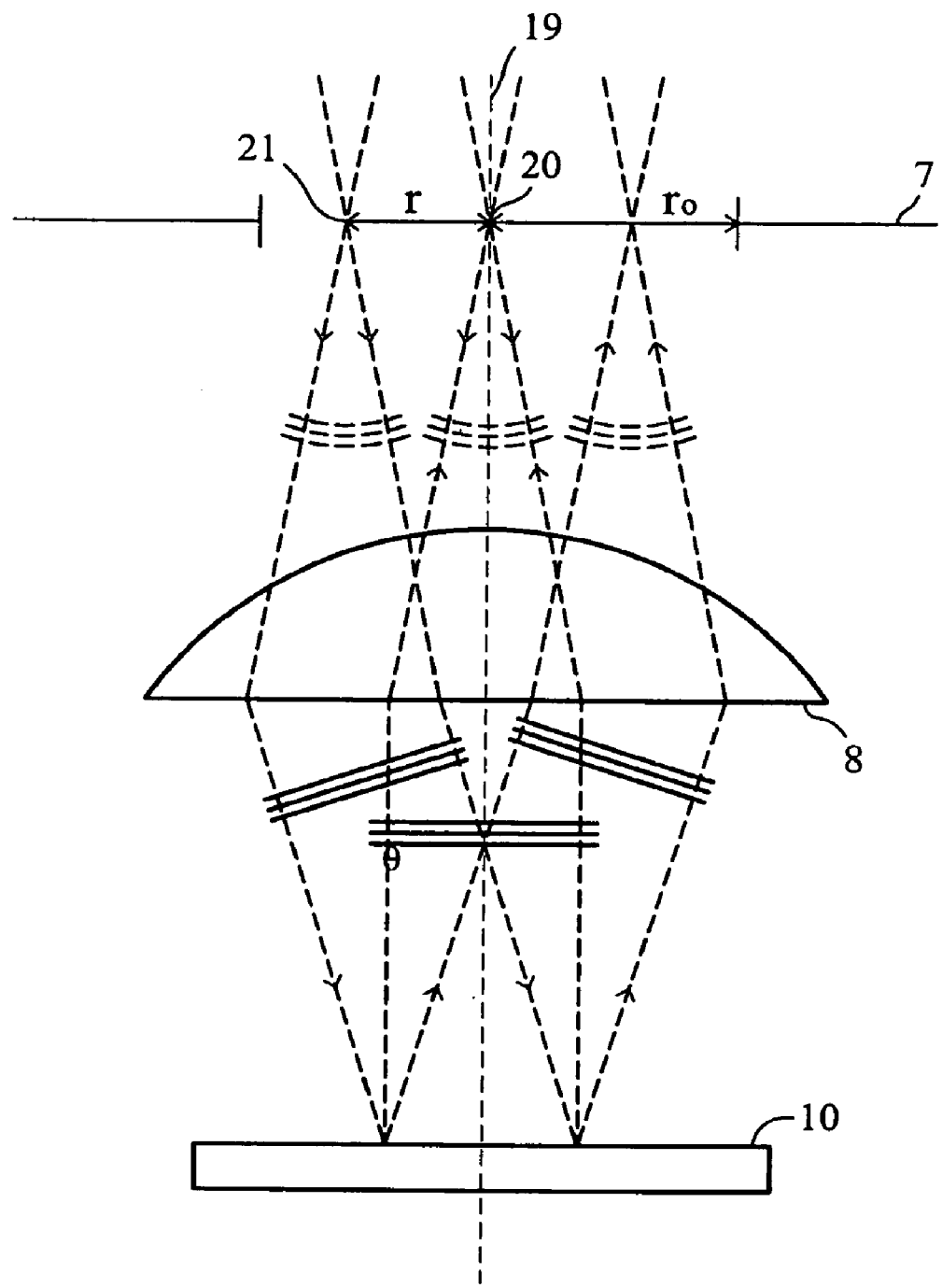
FIG. 2 is a detailed side view of an objective lens of a portion of the embodiment of FIG. 1, and shows light rays impinging upon and reflecting from a test piece.

The field stop 11 serves to reduce stray light in the system 100 by limiting the extent of the optical beam to just fill the detected image field of camera 13. The aperture stop 4 limits the angular extent of the illumination of the test surface 10 if its image in the plane of objective stop 7 is smaller than the objective stop itself. This can be seen in more detail in FIG. 2, wherein the Mirau adapter 14 is omitted for clarity and ease of illustration. The re-imaged source point 20 on the optical axis 19 of objective 8 is the source of a diverging wave that is transformed into a plane wave by objective 8 before it impinges on test surface 10 at normal incidence. The re-imaged source point 21 in the objective stop 7 also is the source of a diverging wave, which again is transformed to a plane wave by objective 8, now however impinging on the test surface 10 at oblique incidence. Like the beam at normal incidence, the oblique beam is reflected by test surface 10, passes through the objective 8, and travels on to camera 13. The further the off-axis source point 21 is from the optical axis 19, the larger the angle of incidence of the oblique beam. The exact relationship is given by the sine-condition:

$$\sin\theta = r/f \quad (1)$$

where θ is the angle of incidence, r is the distance of source point 21 from the optical axis 19, and f is the focal length of the objective 8. This equation is also used for the definition of the numerical aperture ("NA") of objective 8:

$$NA = n \cdot \sin(\theta_0) \quad (2)$$

where n is the refractive index of the medium in object space and $\theta_0$ is the maximum angle of incidence given by the radius $r_0$ of the objective stop 7.

As noted, light source 1 in the presently preferred embodiments and presently preferred method implementations is a broadband light source. Thus the interferogram intensity detected at each pixel of the camera 13 as function of the test surface position $z_t$ is given by a superposition of beams of different wavelength and different angle of incidence in object space, (G. Kino, S. Chim, Mirau correlation microscope, Applied Optics 29, 3775-3783):

$$I(z_t) = const + \text{Re}\left\{\int_{K\,min}^{K\,max} G(k)S(k)\right\} \quad (3)$$

where k is the wavenumber given by 2π/λ, and λ is the wavelength, G(k) is the spectral power density of the light source 1 between $k_{min}$ and $k_{max}$, S(k) describes the spectral transmittance of the common-path part of the interferometer system 100 from the light source 1 to the camera 13 as well as the spectral responsivity of camera 13, L(θ) describes the light intensity at angle θ, $\rho_t(k,\theta)$ is the complex spectral reflection coefficient of the test surface 10 at wavenumber k and angle θ, $\rho_r(k,\theta)$ is the complex spectral reflection coefficient of the reference optics at wavenumber k and angle θ, including the amplitude and phase effects of the reference surface 16 and interferometric beam splitter 15, i is the imaginary unit, Re signifies the real part of the complex number in the braces { }, and the asterisk denotes the complex conjugate.

The above equation (3) assumes a rotationally uniform illumination of the objective stop 7 where the wavelength effects can be factorized from the spatial effects. Furthermore, all polarization effects are neglected. To account for polarization, equation (3) can be extended, e.g., using the coherency-matrix formalism. (M. Born, E. Wolf, Principles of Optics, 7th edition, Cambridge University Press, Cambridge, 1999.)

In optimizing the performance of interferometer 100, and in the preferred method implementations as described more fully herein below, it is usually desirable to calibrate the interferometer and to cancel out contributions to the interferometry signal outputted from the interferometer that are attributable to the machine itself. Equation (3) shows that the properties of the reference optics of the Mirau interferometer 100 are mixed with the properties of the test surface 10 under the .theta.-integral. Thus, a rigorous calibration and elimination of the reference optics properties requires knowledge at all wavenumbers and all angles. In order to simplify the tool calibration and also make the suppression of polarization effects in the interferometer optics valid, the range of illumination angles can be reduced such that the .theta.-variation in equation (3) can be neglected. This may be achieved by using an objective 8 with a sufficiently small numerical aperture ("NA"). However, the imaging resolution of the test surface 10 is lower for smaller NA. To maintain a higher imaging resolution, an objective 8 with higher NA can be used while the aperture stop 4 is reduced in size, and the illuminating NA is smaller than the imaging NA. For typical cases of test surfaces such as CMP products, an illuminating NA of less than 0.15 is suitable [00]. For data acquisition, the z-position of the test surface 10 is scanned at a given location on the surface while frames of the interferogram intensities are acquired by camera 13. For further processing, the varying part of the intensity signal is of interest. Switching to complex notation, the varying intensity part of equation (3) is obtained as function of scan position z with the simplification of low NA illumination:

$$i(z) = \int F(k)\rho t(k)\rho r^*(k)e^{2ik(z+zi)}dk \quad (4)$$

where F(k)=G(k)S(k) is a real function containing the spectral radiance of the light source 1, the camera responsivity and common-path optical properties of the interferometer optics in a suitable normalization, and $z_t$ is now the test surface position for z=0 with respect to $z_r$, i.e., it replaces $z_t$-$z_r$ in equation (3). Combining all interferometer parameters into one complex tool function H(k) with:

$$H(k) = F(k)\rho_r^*(k) \quad (5)$$

we obtain for equation (4)

$$i(z) = \int H(k)\rho t(k)e^{2ikz}e^{2ikz}dk \quad (6)$$

Fourier transforming this intensity signal yields the complex spectral reflection coefficient of the test surface, multiplied with the tool function H(k) and a phase factor, (B. Lee, T. Strand, Profilometry with a Coherence Scanning Microscope, Applied Optics 29, 3784-3788, 1990):

$$S(k) = FT\{i(z)\} = H(k)\rho_t(k)e^{2ikzi} \quad (7)$$

In order to completely characterize or calibrate the interferometer tool 100, H(k) needs to be determined. To do this, a known surface can be measured with the interferometer, i.e., a calibration surface with a known complex spectral reflection coefficient $r_{c(k)}$ is placed as test surface 10 in the interferometer 100. Fringe signal $I_{c(k)}$ is obtained from a measurement of this calibration surface:

$$ic(z) = \int H(k)\rho_c(k)e^{2ikz_c}e^{2ikz}dk \quad (8)$$

where $z_c$ is the position of the calibration surface. To explicitly obtain H(k), the intensity signal $i_c(z)$ is Fourier transformed and the known spectral reflection coefficient $\rho_c(k)$ is eliminated:

$$\rho_t'(k) = \rho_t(k)e^{2ikz t} = s(k)/H(k) \quad (9)$$

Note that the complex function H(k) is only known to within a linear phase term depending on z.sub.c. Thus z.sub.c can be considered the new z-coordinate origin to which all test surface measurements are referenced when the tool 100 is calibrated. The calibration is this simple only with reduced illumination angles. Without this angle restriction, the calibration of the interferometer requires calibration measurements with different angles of incidence in test surface space such that .rho..sub.r(k,.theta.) is explicitly obtained.

In the spectral domain, the tool function now can be eliminated from the measurement:

$$H(k)e^{2ikzc} = FT\{i_c(z)\}/\rho_c(k) \quad (10)$$

where z.sub.c has been set to 0 as the new z-coordinate origin. Equation (10) can be executed wherever the tool function H(k) is unequal to zero, or for good noise performance where the tool spectrum has sizeable amplitudes.

In accordance with various aspects of the invention, the interferometry signal and/or the data acquired from it are transformed into an n-dimensional function comprising an independent frequency variable and an independent time variable. According to another related aspect of the invention, the interferometry signal and/or data from it are transformed to an n-dimensional function having an independent scale variable and an independent time variable. The n-dimensional function preferably is 2-dimensional, although others are possible. According to yet another aspect of the invention, a window function is applied to the interferometry signal to obtain a windowed interferometry signal, obtaining a frequency domain signal from the windowed interferometry signal, and constructing a multi-domain function from the frequency domain signal and the time domain signal. The multi-domain function preferably is a 2-domain function although, again, others are possible.

Although not wishing to be limited to any particular theory of operation, it is noteworthy that, in the spectral domain, $\rho'_t(k)$ contains the information about the test surface properties as well as the test surface position, i.e., test surface height. The spectral coefficient can provide information about the composition of the surface, for example, such as the refractive index or indices of a film layer or layers comprising the surface. If the spectral reflection coefficient of the test surface is known, it can be eliminated from $\rho'_t$ and one can obtain $z_t$ in a number of ways. (See, e.g., P. DeGroot, X. C. DeLega, J. Kramer and M. Turzhitsky, Determination of Fringe Order in White Light Interference Microscopy, Applied Optics 41, 4571-4578, 2002). However, if the spectral reflection coefficient of the test surface is unknown, the surface topography cannot be independently obtained.

Depending on the material and structure of the test surface 10, three different cases mainly can be considered for the spectral reflection coefficient.

In the first case the test surface is the top surface of a bulk material. For example, it may be the top surface of a thick dielectric material where the bottom surface does not contribute to the interference signal, or it may be the top surface of an opaque metal. The spectral reflection coefficient is given by the refractive index of the material. (See, e.g., Born, above).

$$\rho t(k) = \frac{N_0(k) - N_1(k)}{N_0(k) + N_1(k)} \quad (11)$$

where $N_0(k)$ is the refractive index of the object space (real), and $N_1(k)$ is the refractive index of the test surface material. If the test surface consists of a dielectric material, $N_1$ is real and the phase shift on reflection is either 0 or $\pi$ radians. If the test surface consists of a metal with some absorption, $N_1$ is complex with:

$$N_1(k) = n_1(k) - i\kappa_1(k) \quad (12)$$

where $n_1(k)$ is the real refractive index and $\kappa_1(k)$ is the extinction coefficient.

In the second case the test surface is the top surface of a single or multi-layer stack of thin films on a substrate. The complex reflection coefficient depends now on the refractive index and the thickness of each layer as well as the substrate. It can be calculated by known matrix techniques. (See, e.g., H. A. McLeod, Thin-film Optical Filters, 3rd Edition, Institute of Physics Publishing, Bristol, 2001.) Additional factors, such as surface roughness and interface, also can be accounted for by modeling.

In the third case, the test surface is a micro-structured surface. Thin metal lines, for example, may be embedded in a surrounding dielectric layered material on a wafer surface after CMP. The complex reflection coefficient can be calculated by vector diffraction methods such as Rigorous Coupled Wave Analysis ("RCWA"). (See, e.g., M. G. Moharam, E. B. Grann, D. A. Pommet, Formulation of Stable and Efficient Implementation of the Rigorous Coupled Wave Analysis of Binary Gratings, J. Opt. Soc. Am. A12, 1068-1076, 1995; and M. G. Moharam, D. A. Pommet, E. B. Grann, Formulation of Stable Implementation of the Rigorous Coupled-Wave Analysis for Surface Relief Gratings; Enhanced Transmittance Matrix Approach, J. Opt. Soc. Am. A12, 1077-1086, 1995.)

Only in the simple first case is it possible to directly invert the spectral reflection coefficient to obtain the refractive index of the material. In the two other cases it is not possible to use a direct inversion to obtain detailed surface parameters. To determine the layer materials and thickness, and/or micro-structure parameters, a fitting technique can be applied that compares the measured spectral reflection coefficients with calculated model reflection coefficients and selects the model with the best match. This numerical technique has been applied in other measurement instruments such as a spectrophotometer, ellipsometer, or scatterometer.

In the cases described herein above, it has been assumed that all materials are isotropic and there is no dependence on the plane of polarization at normal incidence. This is usually not true for micro-structured surfaces that likely will have preferential directions and different reflection coefficients for different polarizations. If there is any anisotropy in the surface response, one or more interferometric measurements can be carried out with polarized light of different states of polarization, providing additional information for the fitting process.

The fitting process for determining the detailed structure of the test surface experiences two main problems. The first problem is the potential correlation of the z-position of the test surface with the surface model parameters such as layer thickness or material index. Techniques exist to overcome this problem, for example, by basing the fit on the amplitude of the spectral reflection coefficient, or by eliminating the spectral phase slope before the fit. The second problem arises when there are a large number of fit parameters, leading to a lack of convergence, which in turn can result in large uncertainties. This problem may occur in the case of multi-layers with many free parameters such as layer thickness or material. This problem of too many fit parameters is not overcome by the fitting directly in the z-domain, as described in U.S. Patent Publication No. US 2004/0189999 A1, De Groot et al.

To overcome these difficulties, a mixed-domain signal analysis technique is used in the present embodiment and present method implementations. This optionally but preferably may be combined with an optimized light source to allow for separating signal components from lower layers in a film stack. Although again not wishing to be limited to any particular theory, this aspect of the invention takes advantage of the fact that the response from multilayer-stacks can be accurately modeled as a superposition of a beam reflected at the top surface with an infinite number of beams experiencing an increasing number of internal reflections within the multilayer stack before exiting. Hence the complex reflection coefficient may be written:

$$\rho_t(k) = \sum_{q=0}^{\infty} A_q(k) e^{i\alpha_q k} \quad (13)$$

where $A_q(k)$ is the complex amplitude of the qth beam containing the non-linear phase terms from the reflections as well as from the propagation through layers with dispersion, and $\alpha_q$ is the effective z-shift of the qth beam with respect to the top surface. The index q=0 signifies the beam reflected at the top surface. With equation (6) we can take the Fourier transform of the time signal and obtain:

$$i(z) = \sum_{q=0}^{\infty} e_q(z - \alpha_q) \quad (14)$$

where the qth component $e_q$ is shifted by $\alpha_q$ and given by:

$$e_q(z) = h(z) * \alpha_q(z) \quad (15)$$

where h(z) is tool z-response function given by the Fourier transform of the tool function H(k), $\alpha_q(z)$ is the Fourier transform of the spectral amplitude variation of the qth beam, and * represents the convolution operator.

As noted herein above, preferred system embodiments and methods comprise a vertical scanning aspect in which the vertical scan is divided into a plurality of time segments. Accordingly, the scanning interferometry system comprises means for vertically scanning a position on the surface of the test object, and the processor comprises means for dividing the interferometry signal into a plurality of time-differentiated segments. The means for dividing the interferometry signal into a plurality of time-differentiated segments preferably spaces the time-differentiated segments so that each of the time differentiated segments has an equal time duration, and preferably an equal length as well. The means for dividing the interferometry signal into a plurality of time-differentiated segments preferably divides the plurality of time differentiated segments so that the time differentiated segments overlap one another.

The means for vertically scanning a position on the surface of the test object may take a number of forms, provided it produces the appropriate scanning function, e.g., the appropriate relative movement to vary the OPD between the reference surface and the test surface. Either surface may move, for example, or both surfaces may move. In the presently preferred embodiments and method implementations, this means comprises PZT actuator 18.

The means for dividing the interferometry signal into a plurality of time-differentiated segments also may take a number of forms, but preferably comprises a processor, e.g., processor 17, alone or in combination with circuitry in camera 13. These time-differentiated segments preferably comprise camera frames interposed sequentially as camera 13 records the images of light beam 1*b* from the interferometry system 100.

Typically many fit parameters in a multilayer stack are of concern only when the top layers are transparent, i.e., dielectric. In this case, the $A_q(k)$ are close to constant with a constant phase shift, and the $a_q(z)$ are, to good approximation, a weighted delta-function. Thus, at least for the top dielectric layers of a multilayer film stack the intensity response is a complex superposition of tool z-response functions shifted by the effective shifts $\alpha_q$. For a dielectric top layer, the shift $\alpha_0$ is zero. The further the beam penetrates into the film stack, and the more internal reflections it experiences, the more it is delayed with respect to the beam reflected at the top surface, and the larger $a_q$ will be.

Taking the z-shift information in the z-domain into account at the same time as the spectral information by using a mixed-domain approach allows for optimized fitting of the test surface parameters as well as the surface topography.

The details of the data processing are described below. For the purpose of that discussion, the z-coordinate and the time coordinate are used synonymously, since the actual scanning in the interferometer occurs in time.

For many applications, classical signal analysis strategies are based on time and frequency. Time-domain methods are adequate for tasks such as edge detection, elementary segmentation, and texture analysis problems. But in many situations, the inherent periodicity within a signal pushes toward a decomposition of the signal according to its frequency content, that is Frequency-domain analysis. It is a useful tool for discovering the sinusoidal behavior of a signal. The spectral analysis methods, such as the Fourier transform, permit the solution of some problems that confound time-domain techniques. However, they suffer signal interpretation difficulties when oscillations of interest exist only within a limited time interval since it is an inherently global approach.

The input signal directly obtained from a surface with a multilayer film stack by the scanning interferometers such as described above is a non-stationary signal, that is, it is a signal whose properties evolve in time. If it is transformed into the frequency domain by Fourier transform, for example, as proposed by Kim et al. and De Groot et al. (mentioned above), any local information change in time is spread out over the whole frequency domain. Therefore, an analysis adapted to non-stationary signals requires more than a Fourier Transform.

In accordance with this aspect of the invention, presently preferred embodiments and preferred method implementations mix time-domain approaches with the frequency- and scale-domain approaches. Both combinations provide non-stationary signal analysis. Preferred apparatus and methods decompose a one-dimensional ("1-D") time signal into a two-dimensional ("2-D") mixed-domain function that provides a better way for differentiating between desired information and unwanted information. This is valuable in applications where it is necessary or desirable to identify information localized in time, for example, as experienced in the applications disclosed herein.

Two processing techniques are used in accordance with these presently preferred embodiments and methods. One is a time-frequency analysis, and the other is a time-scale analysis.

In accordance with a related aspect of the invention, a window function is applied to the interferometry signal to obtain a "windowed" interferometry signal, preferably in the processor, and the surface of the test object is characterized using the windowed interferometry signal. This preferably comprises applying multiple windows to the interferometry signal, and more preferably applying multiple windows sequentially over time. Similarly, the invention according to related aspects comprises transforming the data acquired from the interferometry system to the n-dimensional function by applying a window function to the interferometry signal, preferably using multiple windows and more preferably using multiple windows sequentially over time.

As implemented in presently preferred apparatus and methods, the time-frequency analysis slides a time window over the input signal to produce frequencies depending on time. The result from the time-frequency analysis is a 2-D function, called a spectrogram. The time-scale analysis scales the time window width at different frequencies to produce scales depending on time. It provides an alternative to time-frequency analysis, which uses a single analysis window. The result from the time-scale analysis is an n-dimensional function, preferably a 2-dimensional ("2-D") function, called a scalogram. Both techniques result in an n-dimensional transformed signal having an independent frequency or scale variable and an independent time variable. Thus, the presently preferred embodiments and methods according to this aspect of the invention capture both the frequency or scale components of the input signal and their time locality. These spectrograms and scalograms provide much more rich and detailed information related to the properties of the test surface as well as the measuring system than the 1-D spectrum from the Fourier transform.

Figure 6:
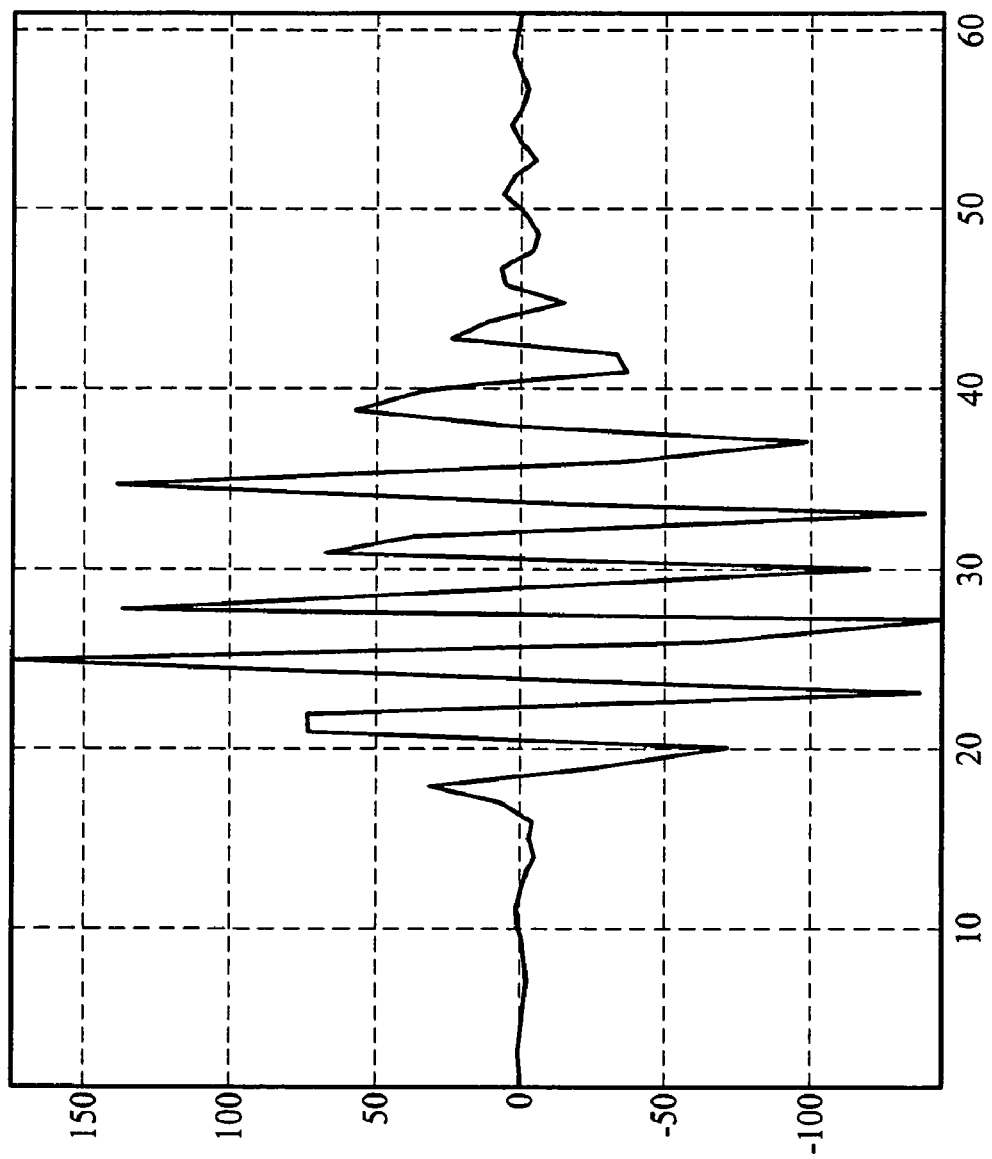
FIG. 6 is a graph of an interferometry signal outputted by the interferometer of FIG. 1, wherein the intensity of the interferometric signal is plotted along the y axis as a function of time on the x axis.
Figure 7:
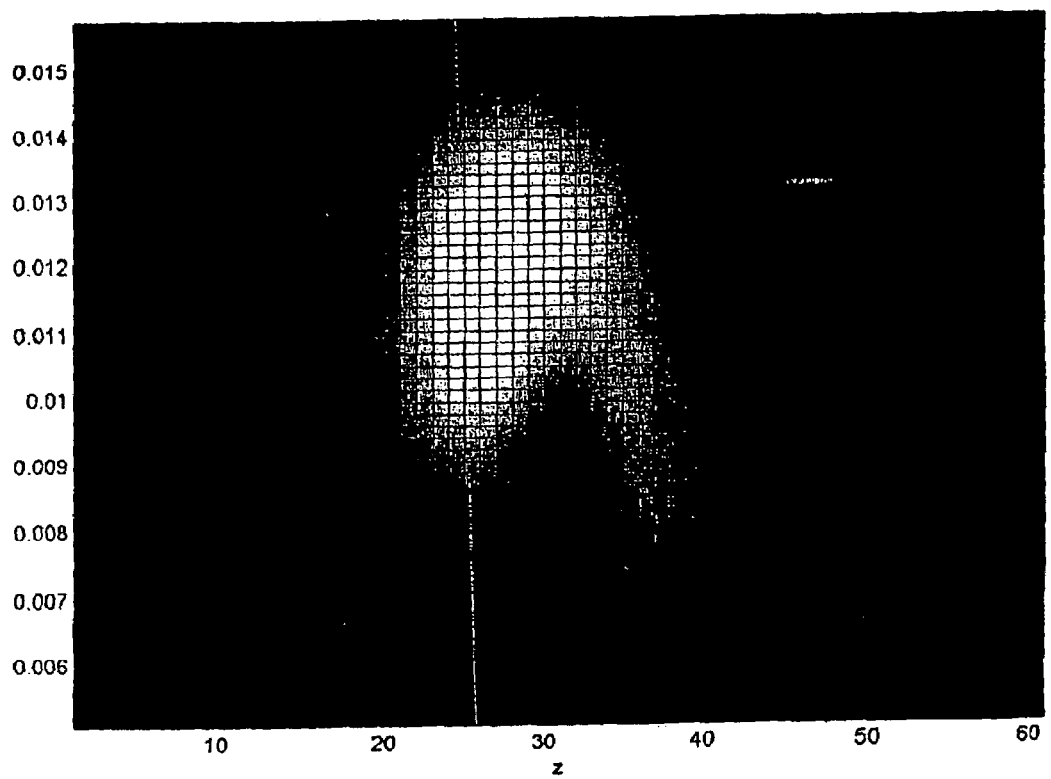
FIG. 7 is a graphical output according to a presently preferred method implementation according to another aspect of the invention, wherein both time-domain and frequency domain information are presented for the interferometry signal of FIG. 6, and in which time or distance corresponds to the x axis, frequency corresponds to the y axis, and the relative amplitudes of the time-frequency domain signal are plotted as grey level.

A typical temporal intensity distribution, obtainable directly from scanning interferometer 100 for a test surface 10 with multiple transparent thin films, is depicted in FIG. 6. This is a time signal because its data are acquired sequentially as the vertical or z-position changes in time. The time-frequency analysis is selected to process the temporal intensity distribution i(z), or in general the non-stationary time signal x(z). The general form for time-frequency analysis is defined by:

$$X(b, \omega) = \int x(z) \frac{1}{\sqrt{a}} g\left(\frac{z-b}{a}\right) e^{-j\omega z} dz \quad (17)$$

where g(z) is a window function, a is a fixed scale factor, w is the angular frequency, and b is the location of the window in time or the temporal position z. By selecting the Gaussian window for g(z) and a=1, a Gabor transform is obtained. In this case the result for the time-frequency analysis of the time signal of FIG. 6 is a spectrogram whose amplitude is depicted in FIG. 7. Amplitude in FIG. 7 displays as brightness, the lightest areas being greatest amplitude. Note that the y-axis is the angular frequency w. Both phase and amplitude values of the spectrogram are directly related to the position z.

There are many window functions g(z) other than the Gabor transform, such as B-spline, Hann, Hamming, Blackman, Harris-Nutall windows, etc. The window function, in fact, can be any function that decreases with distance from its center. The window width can be an important parameter to be determined in every application. To extract more localized time information, a shorter window width can be selected. The window width chosen in this application depends on the width of the tool z-response function h(z), which is determined by the tool function H(k). The narrower h(z), the smaller is the window width and the better is time domain resolution. This is because any data outside the window does not have any effects on determining surface properties and height inside the window. Thus, the shape and width of the tool function, and hence the light spectrum, can play an important role in the instrument.

Having generated the transformed n-dimensional function, it is then compared with a set of models to determine a best match from the comparison. Similarly, having generated the multi-domain function, it also may be compared with a set of models to determine a best match from the comparison.

The n-dimensional function and/or multi-domain function generated from the interferometry signal is compared with a set of comparable models, preferably functions similar to those of the n-dimensional function and/or the multi-domain function from the interferometry signal, respectively, that represent various surfaces and surface conditions or characteristics hypothesized to be present with the test surface. These models preferably reflect different surface properties, such as films, film thicknesses, refractive indices, time position, line width, etc. that may be present at the test surface. The comparison may take the form of parameters of the functions and/or models as well, or alternatively. In the presently preferred embodiments and methods, each function from each sample of the interferometry signal, i.e., each interferogram obtained for the test object, is compared with each model to ascertain a best match from among the models with the function from the test object. From this best match, the surface structure, characteristics, etc. that constitute or correspond with the best matching model are selected as the surface structure, characteristics, etc. of the test object under analysis. The surface properties are determined from the best match.

Preferably, the analysis and comparison comprises applying an appropriate weighting function to the n-dimensional functions and/or the multi-dimensional function. This can produce a robust and accurate comparison between the functions and the models, but also can alleviate or eliminate unwanted information that otherwise would be used in the comparison.

The comparison and selection of a best match from among the models may be carried out in a number of ways. Preferably it is carried out for each spot or location on the test object surface that is to be tested, so that a model match is obtained at each such location. Comparisons and/or correlations also may be made from surface spot or location to spot or location, across the surface or a region of it.

The comparison itself also may take a number of forms. It may, for example, involve selecting one or more parameters from the functions for comparison, for example, such as an intensity measure and a phase shift measure for a particular interferogram. The comparison also may use various techniques to optimize the selection of the model based on predetermined criteria.

Using equation (6), a set of time signals can be generated with a known light spectrum, a constant z-step of the scan, and with different properties of the test surface, such as the film thickness and refractive index of materials. In the presently preferred embodiments and methods, each of these signals is transformed by equation (17) to a spectrogram that is compared with the one obtained from the data directly from the instrument. A 2-dimensional weighting function W(b,w) with larger weights for the more interesting regions and smaller weights or zeros for other areas in spectrograms is used in the comparison. In other words, the information in different areas of the spectrogram may be emphasized differently in the matching process. Thus, spectral components in frequency ranges and time ranges of interest can be compared. Once the best match is determined, the surface properties used for the best-fitting model can be selected as the desired properties. The time position of the input signal (the interferometry signal) relative to the model signal, i.e., the relative surface height, can be determined, for example, from the time position for best amplitude matching together with the phase difference between their spectrograms.

The time-frequency analysis approach described herein presents a complete structural description of a signal. As noted, it preferably comprises trimming the source signal x(z) with a decaying time window function. This technique time-limits, or windows, a signal before calculating its spectrum. Windowing furnishes better estimates of a signal's spectrum, for example, because it restricts the signal values to those over which the relevant oscillatory waveform features should appear. Windowing inherently provides a true local spectrum that is free from the influence of data outside the window. In modeling, this implies that the properties of those films and of the substrate far away from the top surface do not need to be known in profiling the top surface or in finding the top film parameters. This inherent property of time-frequency analysis gives embodiments and methods according to these aspects of the invention a great advantage over other methods, for example, such as those based on Fourier transforms.

In order to increase the processing speed and robustness of finding the desired surface properties with the spectrogram comparison, a set of time signals can be generated that matches the time phase at a fixed location of the input signal, such as the phase at the maximum envelope position, or the phase at another time position of interest. This set of time signals can be obtained by equation (6) with changing time positions z. Thus, spectrograms can be compared without relative time position changes. Similarly, the desired surface properties can be determined once the best matching spectrogram is known. The time position z for generating the time signal for the best matching spectrogram normally is the relative surface height. There are other time-frequency analysis techniques available, such as Wigner-Ville and Zak transforms, (see, e.g., R. D. Allen, D. W. Mills, Signal Analysis, IEEE Press, 2004), which have forms different from Equation (17). They also may be used to transform the time signal to the time-frequency domain.

In addition to time-frequency analysis, the time-scale analysis or wavelet transform (WT) can be used for the analysis of non-stationary signals. In contrast with time-frequency analysis, which uses a single fixed window, the WT uses short windows at high frequencies and long windows at low frequencies. Thus, it has a varying time-frequency resolution that results in more effective handling of signals with transients and components whose pitch changes more rapidly than time-frequency analysis. The time-scale or WT thus may be especially valuable in the analysis of an input signal from a surface that has very thin films and any sudden signal changes.

The wavelet transform uses a signal scale variable instead of a frequency variable in its transform. The general form of the wavelet transform of a signal is given by the coefficient W(a,b):

$$W(a, b) = \int_{-\infty}^{\infty} x(z)\psi_{a,b}^*(z)dz \quad (18)$$

where the superscript * denotes the complex conjugate, and a complete set of daughter wavelets is generated from the mother wavelet $\psi(z)$ by dilations and translations:

$$\psi_{a,b}(z) = \frac{1}{\sqrt{a}}\psi\left(\frac{z-b}{a}\right) \quad (19)$$

where a is the scale factor, b is the translation factor, and $$\frac{1}{\sqrt{a}}$$

is the normalization factor.

Figure 8:
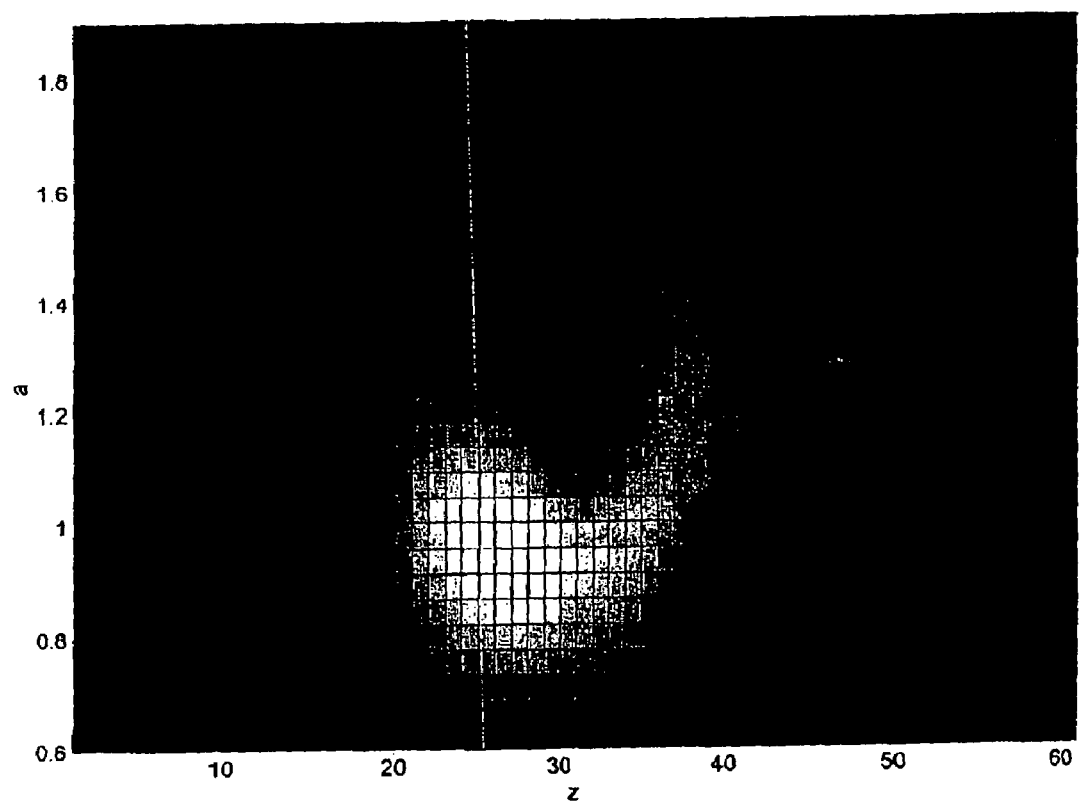
FIG. 8 is a graphical output according to another aspect of the invention, wherein both time-domain and scale domain information are presented for the interferometry signal of FIG. 6, and in which time or distance corresponds to the x axis, scale corresponds to the y axis, and the relative amplitudes of the time-scale domain signal are plotted as grey level.

There are various wavelets available, (see, e.g., A. D. Poularikas, The Handbook of Formulas and Tables for Signal Processing, CRC Press LLC, 1999). By using Morlet wavelet defined as:

$$\psi_{a,b}(z) = g\left(\frac{z-b}{a}\right)e^{j\omega_c z/a} \quad (20)$$

where g(z) is the Gaussian window and $\omega_c$ is the center of angular frequency, the result from the wavelet transform of the time signal, shown in FIG. 6, is a scalogram whose amplitude is depicted in FIG. 8. Unlike the spectrogram, its y-axis is the scale factor a. All the process steps in time-scale analysis for this application are the same as in the time-frequency analysis except using the scalogram instead of the spectrogram.

After the data acquisition and the extended mixed-domain processing as described herein, depending on the test surface, two-dimensional or n-dimensional maps of top-surface topography, film-thickness profiles, material distribution, and micro-structure parameters such as line width or line thickness can be generated. These maps can be used as the final result of the measurement. In addition, a host of information can be extracted from these maps. For example, in the case of CMP process control, special parameters of interest may be extracted, such as dishing, erosion, and top layer film thickness. Furthermore, the thickness of opaque metal structures can be inferred from the top surface topography in combination with the thickness of dielectric films adjacent to the copper structure.

In accordance with another aspect of the invention, apparatus and methods are provided for modifying the spectral composition of the light beam so that it facilitates the desired task of obtaining information about the test object surface. One of course may select the light source using the spectral composition of the light beam as a selection criteria, e.g., so that it comprises or consists essentially of those spectral components that provide beneficial results for the overall process. One also may modify the light beam produced by the light source so that the light beam has the desired spectral composition, for example, using a filter or other optics to condition the beam. In addition or alternatively, one may use signal processing techniques to modify the interferometry signal, for example, at the camera, in the processor, or both, to obtain the desired spectral composition.

In order to support this data processing procedure in the presently preferred embodiments and method implementations, the tool function H(k) of the interferometer is optimized for separation of the signals from the lower layers of multilayer stacks from the top surface signal. With this separation, a successful fit of layer parameters of the upper portion of the multilayer stack can be carried out without overloading the fit procedure with too many fit parameters corresponding to lower layers, or converging to the wrong model due to insufficient information about the lower layers.

According to equation (5), the tool function H(k) is affected by the spectral radiance of the light source 1, the optical properties of the common-path interferometer optics, the optical properties of the interferometric beam splitter 15 and reference surface 16, and the spectral responsivity of camera 13. For a given interferometer, the light spectrum going into the interferometer can be affected to change H(k).

As an example to illustrate this aspect of the invention, an optical filter such as an interference filter 22 with a desired spectral transmittance function can be placed between lenses 2 and 3 of the interferometer to modify light beam 1a, as shown in FIG. 1.

In another embodiment, the light source 1, lenses 2 and 3, and the spectral filter 22 may be placed remotely in a separate unit where the output is coupled to the interferometer by an optical fiber or fiber bundle. In this case the output end of the fiber is placed directly in the plane of the aperture stop 4.

Figure 3A:
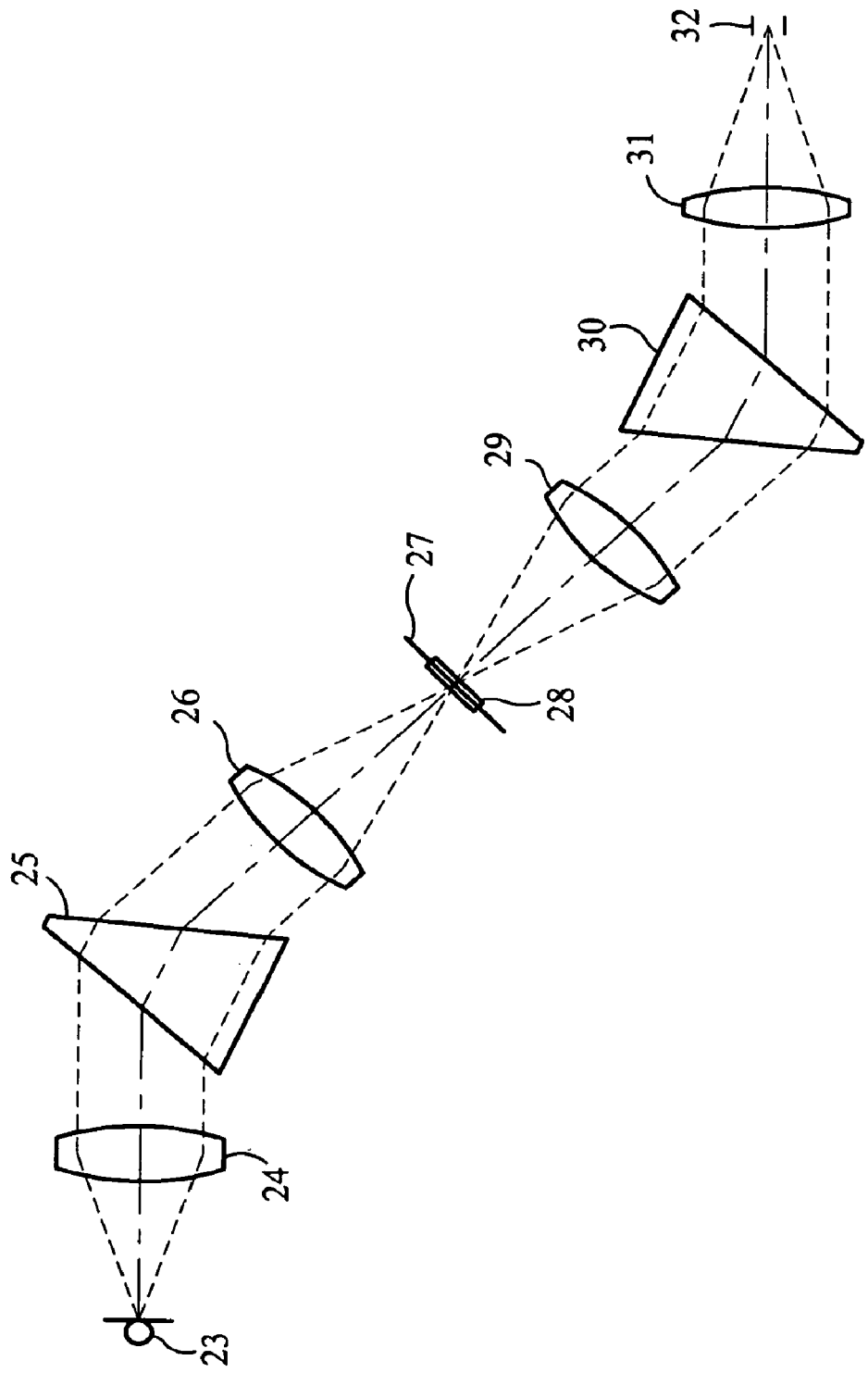
FIG. 3 is a diagram of a spectral filter useable with the interferometer of FIG. 1 in accordance with another aspect of the invention.
Figure 3B:
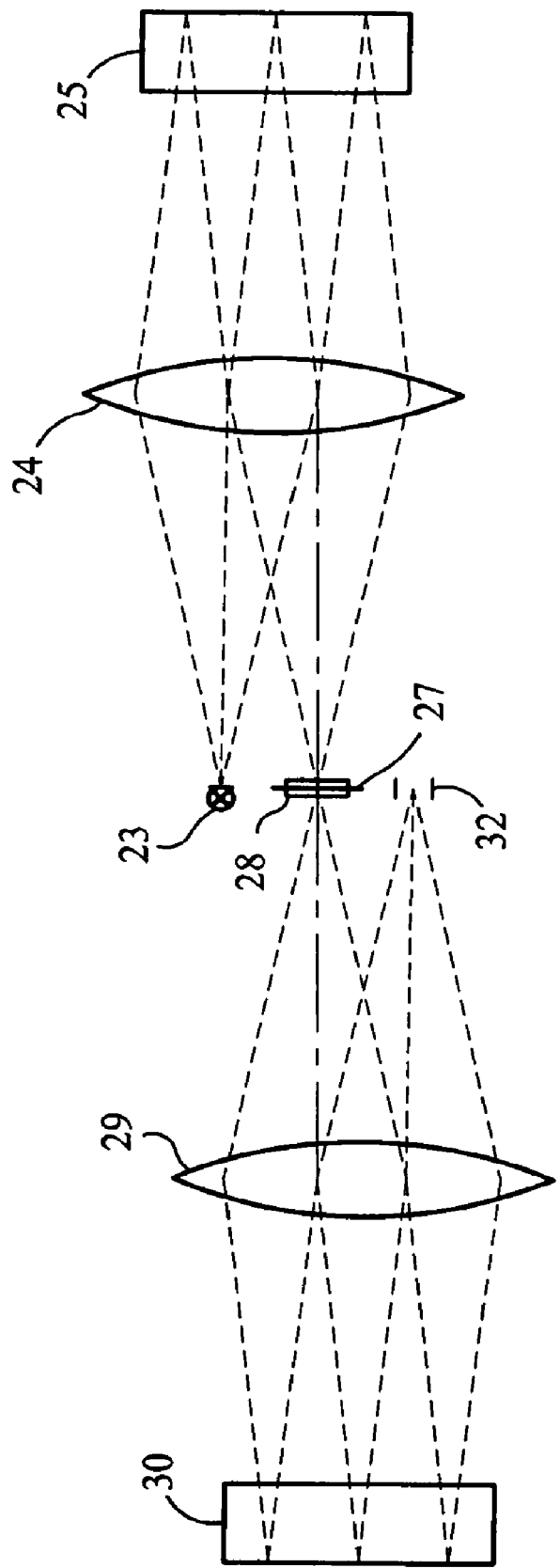
Figure 3C:
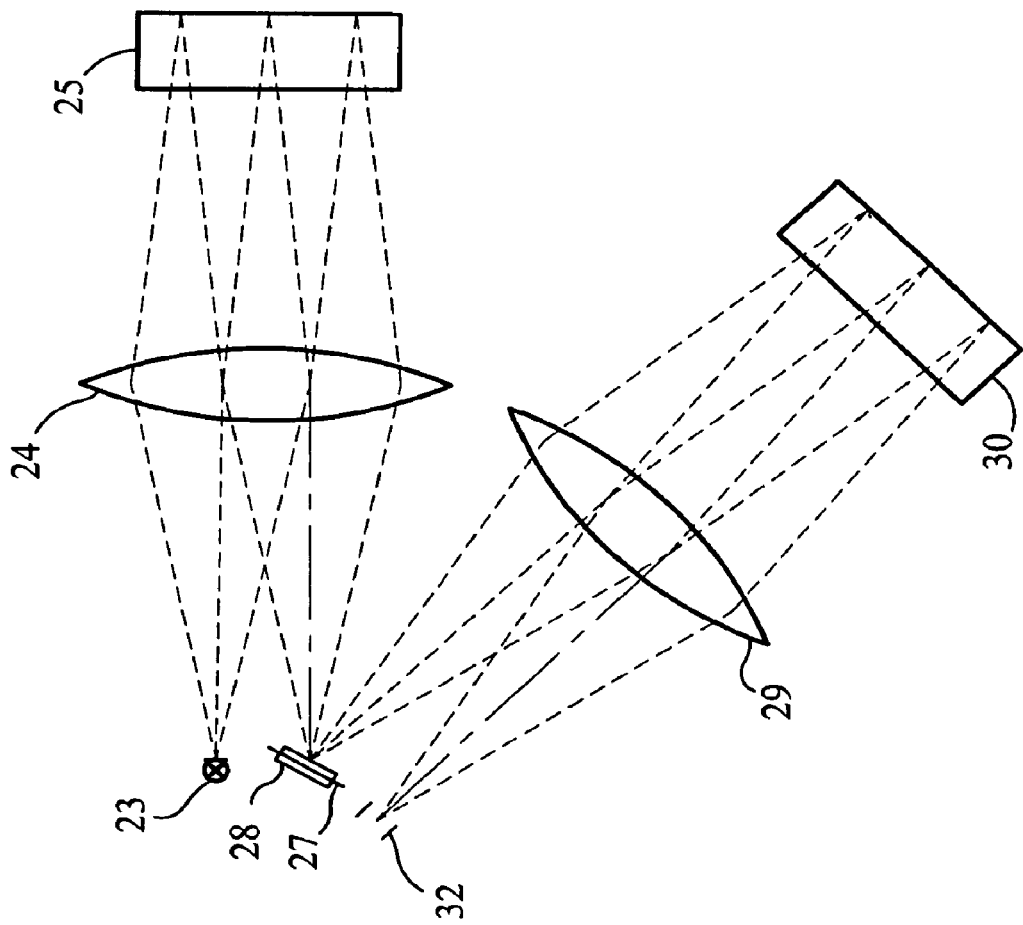

In yet another embodiment, the light source 1 can be replaced by the output aperture of a spectral shaping device. FIG. 3 shows a schematic of such a device. The broadband light from a light source 23 with appropriate aperture is collimated by lens 24, dispersed by prism 25, and focused by lens 26 onto the spectral dispersion plane 27. In the spectral dispersion plane 27 the spectral content of the beam is modified by a filter 28 as described below. The beam then propagates further to lens 29, where it is collimated again. Prism 30 reverses the spectral dispersion, such that lens 31 focuses the light of all wavelengths onto the output aperture of the spectral shaping device at aperture 32.

Figure 4:
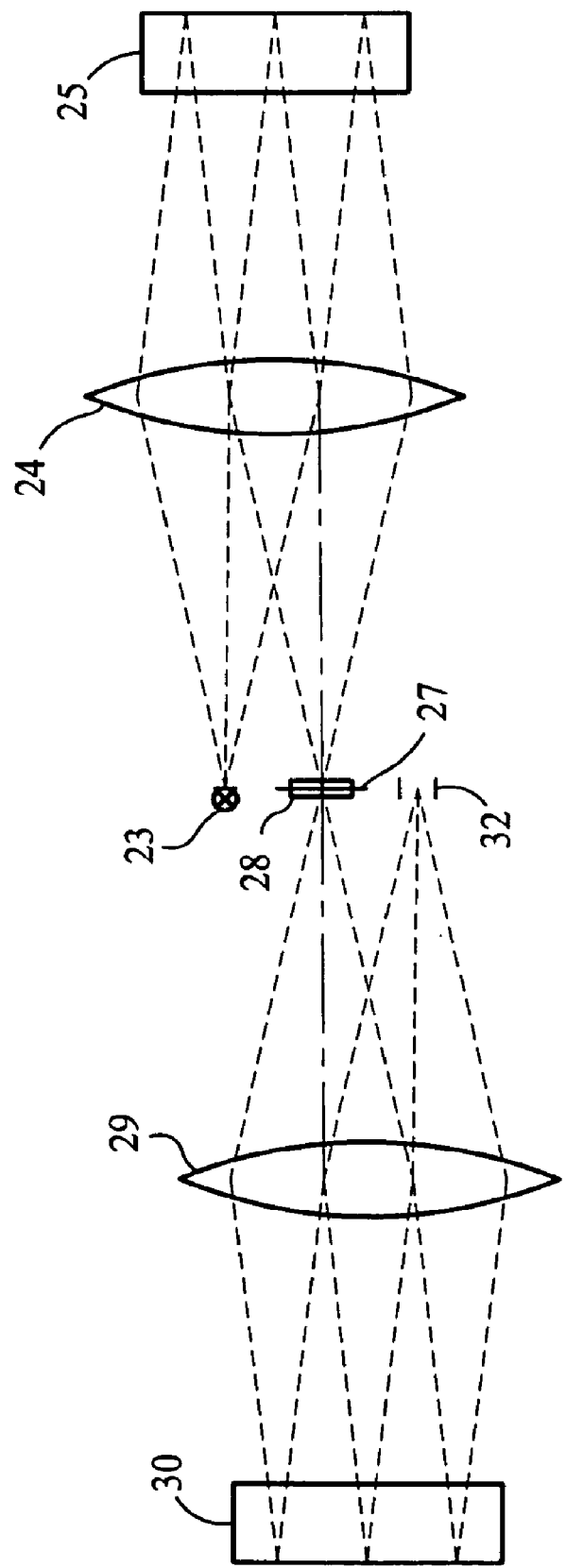
FIG. 4 shows another spectral filter useable with the interferometer of FIG. 1.

Another embodiment of a spectral shaping device according to this aspect of the invention is shown in FIG. 4. There light from source 23 is collimated by lens 24 and dispersed by prism 25. Prism 25 now functions as a Littrow-prism that retro-reflects the dispersed beam. The reflected beam is focused by lens 24 onto the spectral dispersion plane 27, where it is filtered by filter 28. From the filtering plane, the light propagates to lens 29, and further to prism 30 which reverses again the spectral dispersion, and is focused by lens 29 on the output aperture 32.

Note that in FIG. 4 the direction of dispersion in plane 27 is normal to the drawing, whereas in FIG. 3 the direction of dispersion is in the drawing plane.

Figure 5:
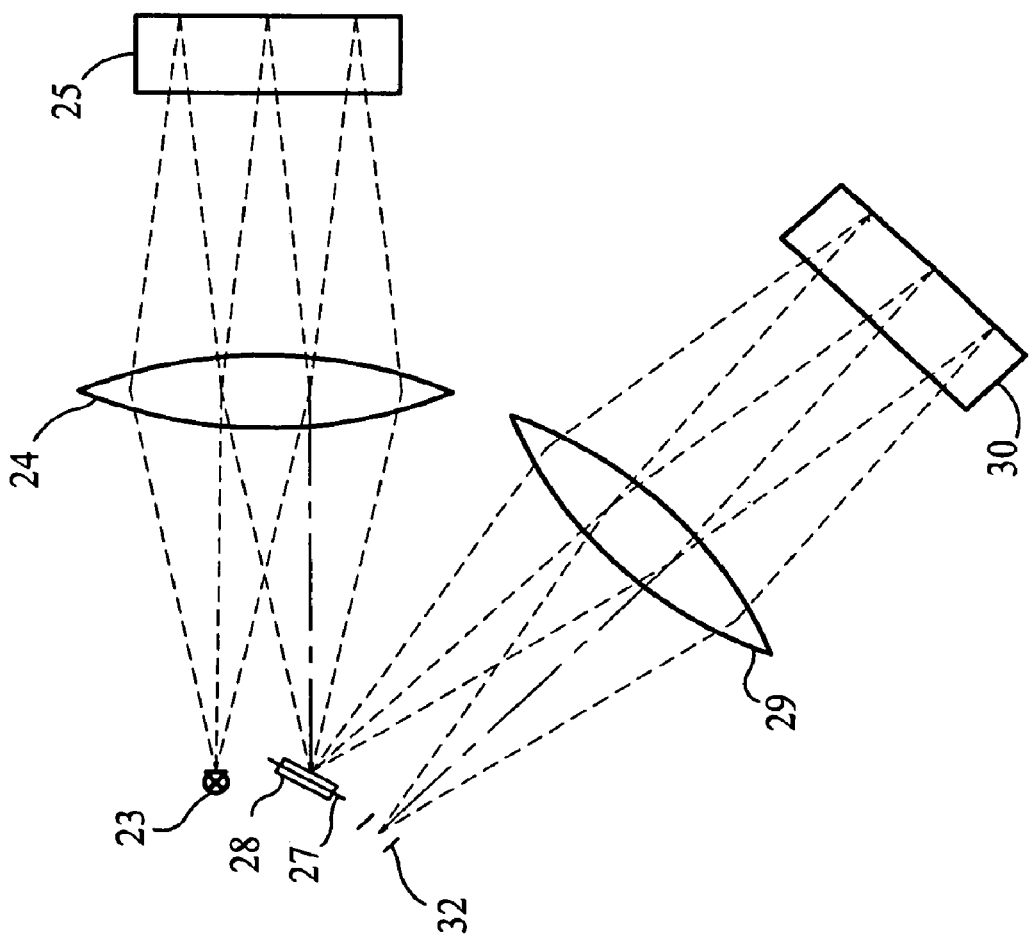
FIG. 5 shows still another spectral filter useable with the interferometer of FIG. 4.

Yet another embodiment is shown in FIG. 5, which differs from FIG. 4 in that the spectral filtering in the dispersion plane 27 is combined with a reflection.

Plane gratings also can be used as a dispersive element instead of the prisms in FIGS. 4 and 5. Concave gratings combining the dispersion with the focusing power of lenses 24 and 29 also could be used instead of the lens-prism combinations. Furthermore, the reflection in the dispersion plane 27 can be arranged such that the filtered light is directed back to the light source. However, this requires a beam splitter to deflect the filtered light resulting in a significant loss of light, and normally is not preferred.

In alternative embodiments, the spectral shaping device according to FIGS. 3, 4 or 5 is not directly placed on the interferometer setup, but instead is situated remotely and coupled to the interferometer, for example, with an optical fiber or fiber bundle. In this case, the input end of the fiber is placed in the output plane 32 of the spectral shaping device, and the output end of the fiber is replaces the light source 1 of the interferometer. Alternatively, the output end of the fiber can be placed directly in the plane of the aperture stop 4.

Also the illumination of the spectral shaping device may occur through an optical fiber or fiber bundle.

In the dispersion plane 27, light of different wavenumbers k is spread out along the direction of dispersion. Calling the direction of dispersion the x-direction, the spectrum can be modified by changing the effective transmittance $T(x)$ of the filter 28 for FIG. 3 and FIG. 4. For a fixed filter function, an aperture can be used in plane 27 whose width normal to the x-direction varies such that more or less light of each wavenumber is blocked. For FIG. 5, the effective reflectance $R(x)$ of the filter 28 is controlled by combining the aperture with a mirror in close proximity.

In accordance with a related aspect of the invention, the spectral shaping device may comprise a programmable filter, which in the presently preferred embodiments and methods may comprise programmable spectral filter 28. Programmable filter 28 is operatively coupled to and controlled by computer 17. For the transmissive case a liquid crystal based spatial light modulator is used, whereas for the reflective case a Liquid-Crystal-On-Silicon ("LCOS") light modulator or Digital Mirror Device ("DMD") can be used. These modulators can be operated in an on-off mode for each pixel, thus emulating the aperture described above. A programmable filter allows for optimization of the tool function $H(k)$ based on calibration measurements of the actual interferometer. Thus, part-to-part variations between different instances of the interferometer can be accounted for, as well as aging of optical components and the light source, etc. Furthermore, the optimized tool function can be maintained even when the interferometer configuration is changed, e.g., by placing a polarizer or attenuator in the beam path.

For a good separation of the signals from the lower layers of multi-layer stacks from the top surface signal in the interferograms, a tool z-response function $h(z)$ that is very localized in z and does not have any appreciable side-lobes is preferred if not required. This is common in filter design, (F. J. Harris, On the Use of Windows for Harmonic Analysis with the Discrete Fourier Transform, PROC. IEEE 66, 51-83, 1978), where a desired spectral behavior is obtained by designing a filter in the time domain. Here the point of view is reversed and a filter is designed in the frequency domain to obtain the desired behavior in the z-domain. A window $W(k)$ is selected as desired tool function. Then a calibration measurement is carried out with $H(k)$ as result. From that the filter function $F(k)$ is determined as:

$$F(k)=W(k)/H(k) \qquad (16)$$

When this filter function is used to modify the light spectrum, the resulting tool function becomes $W(k)$. Examples of advantageous window functions are the Blackman-Harris window or the Dolph-Chebysheff window mentioned above in the Harris article. For the programmable filters in the spectral shaping device according to FIGS. 3, 4 or 5, the filter function $F(k)$ is translated into the necessary transmittance $T(x)$ or reflectance $R(x)$ depending on the chosen optical configuration. Because only the common-path properties of the interferometer are affected, only the amplitude of the tool function is affected. Furthermore, the filter function is passive, i.e., we can only have $F(k)<1$. Thus, the support of the window function $W(k)$ cannot be larger than the support of the intrinsic tool function $H(k)$. However, it is desirable to minimize mainly the side lobes in the z-domain, not decrease significantly the overall width of the tool z-response function. Because the presence of side lobes is largely affected by the smoothness and symmetry of the spectrum, a realizable window function can be employed with significant performance improvements in the data processing.

Small changes to the tool function $H(k)$ can also be carried out by numerical filtering. For that purpose, the tool function is determined according to equation (9), and the filter function $F(k)$ is determined according to equation (16). For each camera pixel, the measured intensity signal is then Fourier-transformed according to equation (7), multiplied with the filter function $F(k)$, and inversely Fourier-transformed to obtain the modified intensity signal $i'(z)$. The data processing steps described below then can be carried out with this modified signal $i'(z)$ as input.

Figure 9:
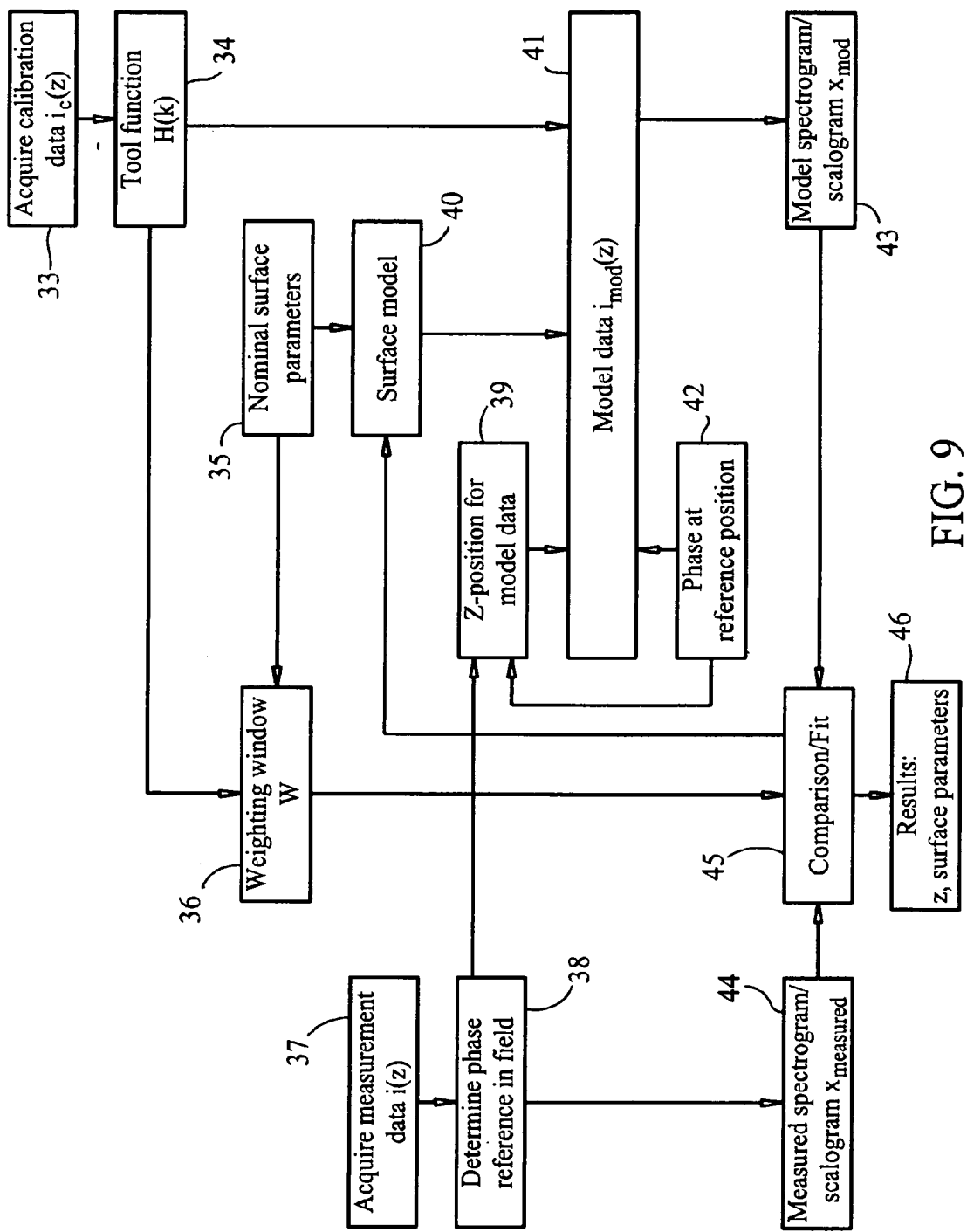
FIG. 9 is a flow diagram that summarizes processing of an interferometry signal from the interferometer of FIG. 1 according to yet another aspect of the invention.

The processing performed in accordance with embodiments and methods of the invention may vary from application to application. To better illustrate the principles of the invention according to these aspects, an exemplary processing scheme for the presently preferred embodiments and preferred methods as described herein above is shown in FIG. 9. For a given tool status, the calibration measurement (33) is executed, preferably once, to obtain the tool function $H(k)$ (34). The tool function $H(k)$ (34) and the nominal surface model parameters (35) are used to determine the choice of the appropriate weighting window function (36) for the mixed-domain comparison. For each test surface measurement, the intensity profiles at all pixels of interest are acquired (37). At a number of selected camera or detector pixels, a phase reference surface is generated (38). At each pixel of interest, the following process is then executed. From the phase reference surface (38), an initial z position for the modeling determined (39). From the assumed nominal surface model parameters (35), a surface model (40) is generated. From the tool function $H(k)$ (34), the surface model (40) and the initial z position (39), the intensity profile $i.sub.mod(z)$ is calculated (41). The phase of this intensity profile at the z position is calculated (42), a correction is applied to the initial z position, and the final modeling z position is obtained (39). Then a new intensity profile $i_{mod}(z)$ (41) is generated from (34), (39), and (40). From this intensity profile $i_{mod}(z)$, the modeled spectrogram or scalogram (43) is obtained. From the measured intensity profile (37) the measured spectrogram or scalogram (44) can be obtained. Taking the weighting window function (36) into account, the measured (44) and modeled (43) spectrograms are compared to find the best match (45). This is done by an iterative non-linear fit, wherein the model parameters (40) are changed and a new model spectrogram (43) is calculated and compared to the measurement until a model is found that matches the measurement well, or a model is found that optimizes the match with the test measurement. From the best matching model, the surface parameters constituting this model, as well as the z position of the top surface (46), are reported as the result.

This processing may be, and preferably is, carried out using a processing means such as computer 17, operating under the control of software in the form of one or more computer programs. In accordance with still another aspect of the invention, a machine readable medium is provided that comprises a program, e.g., one or more computer programs, for performing the processing as described herein. The machine readable medium may be any medium capable of being read by the processing means according to this invention, including but not limited to any of the storage means or devices described herein above, and/or removable or portable storage devices, such as diskettes, external hard drives, jump drives, CDs, DVDs, and the like.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A system to analyze surface characteristics of a test object using broadband light scanning interferometry, comprising:
   an interferometer system to acquire data from a scanning interferometry signal from a surface location of a test object; and
   a processing system to:
      transform the acquired data to an n-dimensional function comprising an independent frequency variable and an independent time variable;
      divide the time variable signal into a plurality of time-differentiated segments;
      divide the frequency variable into a plurality of time differentiated segments corresponding to the plurality of time differentiated segments of the time domain signal;
      compare the transformed n-dimensional function with a set of models to determine a best match from the comparison; and
      use the plurality of time differentiated segments of the frequency variable signal and the plurality of time differentiated segments of the time variable signal to construct the n-dimensional function as a function of time.

2. The system of claim 1, wherein n=2.
3. The system of claim 1, wherein:
   the interferometer system comprises an illuminating numerical aperture and an imaging numerical aperture; and
   the interferometer system uses an illuminating numerical aperture that is smaller than the imaging numerical aperture.
4. The system of claim 1, wherein the processing system creates a spectrogram modified by a weighting function corresponding to desired parameters of interest.
5. The system of claim 1, wherein the wherein the plurality of time differentiated segments of the time variable signal overlap one another.
6. The system of claim 1, wherein the plurality of time differentiated segments of the frequency variable signal overlap one another.
7. The system of claim 1, wherein:
   the interferometer system uses light having an original light spectrum; and
   the processing system modifies the original light spectrum to facilitate comparing the n-dimensional function with a set of models to determine the best match from the comparison.
8. The system of claim 1, wherein the processor system modifies the interferometry signal to facilitate the comparing of the n-dimensional function with the models.
9. A system to analyze surface characteristics of a test object using broadband light scanning interferometry, comprising:
   an interferometer system to acquire data from a scanning interferometry signal from a surface location of a test object; and
   a processing system to:
      transform the acquired data to an n-dimensional function having an independent scale variable and an independent time variable; and
      compare the transformed n-dimensional function with a set of stored n-dimensional function models to determine a best match from the comparison.
10. The system of claim 9, wherein n equals 2.
11. The system of claim 9, wherein:
    the scanning interferometer comprises an illuminating numerical aperture and an imaging numerical aperture; and
    the scanning interferometer system uses an illuminating numerical aperture that is smaller than the imaging numerical aperture.
12. The system of claim 11, wherein the illuminating numerical aperture is less than about 0.15.
13. The system of claim 9, wherein the processing system creates a scalogram modified by a weighting function corresponding to desired parameters of interest.
14. The system of claim 9, wherein the processing system uses at least one of a time-scale transform or a wavelet transform.
15. The system of claim 9, wherein the processing system:
    divides the time domain signal into a plurality of time-differentiated segments;
    divides the scale variable into a plurality of time differentiated segments corresponding to the plurality of time differentiated segments of the time variable signal; and
    uses the plurality of time differentiated segments of the scale variable signal and the plurality of time differentiated segments of the time variable to construct the n-dimensional function as a function of time.
16. The system of claim 15, wherein the plurality of time differentiated segments of the time variable overlap one another.
17. The system of claim 15, wherein the plurality of time differentiated segments of the scale variable overlap one another.

18. The system of claim 15, wherein the processing system implements a spectral shaping of the interferometry signal.

19. The system of claim 9, wherein the processing system:
uses light having an original light spectrum; and
modifies the original light spectrum to facilitate the comparing of the n-dimensional function with the set of stored models.

20. The system of claim 19, wherein the processing system using an optical filter comprising a selected transmittance function.

21. The system of claim 20, wherein the optical filter comprises a programmable filter.

22. The system of claim 20, wherein the processor modifies the interferometry signal to facilitate comparing of the n-dimensional function with the models.

23. A system to analyze surface characteristics of a test object using broadband light scanning interferometry, comprising:
an interferometer system comprising a broadband light beam to vertically scan a position on the surface of the test object and to generate an interferometry signal comprising a time domain signal at selected unique times during the vertical scanning; and
a processing system to:
apply a time differentiated function to the interferometry signal to obtain a frequency domain signal;
divide the time domain signal into a plurality of time-differentiated segments; and
construct a multi-domain function from the frequency domain signal and the time domain signal.

24. The system of claim 23, wherein the time-differentiated segments of the plurality of time-differentiated segments are equally spaced from one another in time.

25. The system of claim 23, wherein the processing system divides the vertical scan into a corresponding plurality of vertical scan segments, wherein the vertical scan segments are of equal length.

26. The system of claim 23, wherein the processing system:
divides the frequency domain signal into a plurality of time differentiated segments corresponding to the plurality of time differentiated segments of the time domain signal; and
uses the plurality of time differentiated segments of the frequency domain signal and the plurality of time differentiated segments of the time domain signal to construct the multi-domain function as a function of time.

27. The system of claim 26, wherein the plurality of time differentiated segments of the time domain signal overlap one another.

28. The system of claim 26, wherein the plurality of time differentiated segments of the frequency domain signal overlap one another.

29. The system of claim 23, wherein the processor compares the multi-domain function with a set of models to determine a best match from the comparison.

30. The system of claim 23, wherein:
the test object comprises m top layers and n bottom layers; and
the processor to spectrally shapes the interferometry signal to comprise a spectral composition that facilitates obtaining the frequency domain signal for the m top layers of the test object while disfavoring obtaining the frequency domain signal for the n bottom layers of the test object.

* * * * *